United States Patent
Ohta

(10) Patent No.: US 6,989,865 B1
(45) Date of Patent: Jan. 24, 2006

(54) OPTICAL EQUIPMENT AND IT CONTROL METHOD, AND COMPUTER-READABLE STORAGE MEDIUM

(75) Inventor: Seiya Ohta, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/211,132

(22) Filed: Dec. 14, 1998

(30) Foreign Application Priority Data

| Dec. 19, 1997 | (JP) | ................................... 9-350965 |
| Dec. 19, 1997 | (JP) | ................................... 9-350966 |
| Dec. 22, 1997 | (JP) | ................................... 9-364757 |
| Dec. 22, 1997 | (JP) | ................................... 9-364759 |

(51) Int. Cl.
    *H04N 5/232* (2006.01)

(52) U.S. Cl. ....................... 348/347; 348/349; 348/358

(58) Field of Classification Search ................. 348/354
    See application file for complete search history.

(56) References Cited

U.S. PATENT DOCUMENTS

| 4,950,054 | A | * | 8/1990 | Wada et al. ................ 359/684 |
| 5,200,860 | A | * | 4/1993 | Hirasawa et al. ........... 359/696 |
| 5,212,516 | A | * | 5/1993 | Yamada et al. ............. 348/354 |
| 5,223,981 | A | * | 6/1993 | Kaneda ...................... 359/698 |
| 5,276,318 | A | * | 1/1994 | Hirasawa ................. 250/201.4 |
| 5,323,200 | A | * | 6/1994 | Hirasawa ..................... 396/81 |
| 5,436,684 | A | * | 7/1995 | Hirasawa .................... 348/347 |
| 5,438,190 | A | * | 8/1995 | Kaneda et al. ........... 250/201.3 |
| 5,486,860 | A | * | 1/1996 | Shiokawa et al. .......... 348/354 |
| 5,786,853 | A | * | 7/1998 | Ohkawara et al. ....... 348/240.3 |
| 5,877,811 | A | * | 3/1999 | Iijima et al. ................ 348/375 |
| 5,956,528 | A | * | 9/1999 | Tanaka ........................ 396/52 |
| 6,046,769 | A | * | 4/2000 | Ikeda et al. .............. 348/222.1 |
| 6,046,863 | A | * | 4/2000 | Chino ........................ 359/697 |
| 6,064,825 | A | * | 5/2000 | Onuki ......................... 396/55 |
| 6,184,932 | B1 | * | 2/2001 | Tanaka ....................... 348/347 |
| 6,314,240 | B1 | * | 11/2001 | Okawara ..................... 396/81 |
| 6,373,524 | B2 | * | 4/2002 | Suda et al. ................. 348/345 |
| 6,396,540 | B1 | * | 5/2002 | Ohkawara ................... 348/345 |
| 6,433,824 | B1 | * | 8/2002 | Tanaka et al. .............. 451/288 |
| 6,445,416 | B1 | * | 9/2002 | Kyuma et al. .......... 348/240.03 |

FOREIGN PATENT DOCUMENTS

JP        62-103616        5/1987

* cited by examiner

*Primary Examiner*—David L. Ometz
*Assistant Examiner*—Yogesh Aggarwal
(74) *Attorney, Agent, or Firm*—Morgan & Finnegan, LLP

(57) ABSTRACT

The object of this invention is to attain accurate control by correcting any deviation of a cam locus due to manufacturing errors and the like upon controlling a zoom lens and focus lens along a theoretical cam locus. To attain this object, a differential locus between the theoretical cam locus (stored cam locus) and a true cam locus due to an error obtained by a measurement is obtained, and is stored as cam correction data. The lens control is made while correcting the theoretical cam locus by the correction data.

22 Claims, 31 Drawing Sheets

OPTICAL EQUIPMENT AND IT CONTROL METHOD, AND COMPUTER-READABLE STORAGE MEDIUM

BACKGROUND OF THE INVENTION

The present invention relates to an optical equipment and, more particularly, to an optical equipment such as a video camera, silver halide camera, electronic still camera, or the like, which comprises an optical system (photographing optical system) having a movable lens group that moves along the optical axis upon focusing or zooming, e.g., an optical system such as a photographing lens of a single focal length, zoom lens, or the like, its control method, and a storage medium.

Conventionally, in case of a rear-focus zoom type lens, the stop positions of a variator used in zooming and a focus lens used in focus adjustment on the optical axis change in units of object distances, as shown in FIG. 1 (these curves will be referred to as "cam loci" hereinafter). Referring to FIG. 1, for example, when the object distance is infinity (or 2 m), the focus lens (RR lens) moves on the optical axis along convex locus Y∞ (or Y2) toward the object side upon movement of the variator from the wide-angle end to the telephoto end on the optical axis.

That is, conventionally, upon zooming from the wide-angle end to the telephoto end or vice versa, when driving of the variator and focus lens is controlled to trace the cam locus in correspondence with the object distance, a good image free from any blur is obtained. That is, conventional cam trace is to merely track the stored cam locus.

However, an optical system and mechanical system normally suffer manufacturing errors, and it is difficult to match their movements with the theoretically obtained stored cam locus. It is also impractical to require of commercial products higher precision in the optical system and mechanical system to attain matching. In addition, with the conventional technique and camera precision, a given blur range cannot be visually recognized. However, as the image quality and magnification become higher in recent years or in the future, such blur range may be easily recognized.

Furthermore, it is important to attain high-precision cam trace with less labor and lower cost.

Also, in an exchangeable lens system that uses an exchangeable lens, an attachment having a zoom effect is normally interposed between lens and camera apparatuses (the attachment will be referred to as an extender hereinafter). However, upon mounting the extender, the cam locus becomes considerably different from that without the extender.

Upon zooming, since the cam loci in units of object distances become denser toward the wide-angle position, as shown in FIG. 1, a cam locus corresponding to a given object distance cannot be accurately selected upon zooming from the wide-angle end to the telephoto end, and the initially selected cam locus may slightly deviate from that corresponding to the object distance.

In such case, blurring takes place upon zooming. For example, upon zooming from the wide-angle end to the telephoto end, when a cam locus corresponding to a non-in-focus object distance (e.g., 1 m) is selected and traced for an object at an object distance (e.g., 2 m) which does not correspond to the original in-focus locus, no blur (deterioration of the in-focus level) is not formed near the wide-angle end, but blur is produced from the middle focal length to the telephoto end. Also, when the object distance changes upon, e.g., movement of an object, an in-focus state cannot be attained by the cam locus traced so far, thus producing a blur.

In order to solve this problem, the following processing is done. That is, the in-focus level is checked by sampling an auto-focus signal (to be referred to as an AF signal hereinafter) at predetermined periods from a video signal obtained from a photoelectric conversion element such as a CCD during zooming. The in-focus level obtained by the previous sampling is compared with that obtained by the current sampling to find a cam locus with higher in-focus level, and the cam locus is traced while changing the cam locus to that with higher in-focus level.

In this case, the AF signal is detected in synchronism with the vertical scanning frequency of the television format used in a video camera in case of the video camera. That is, the AF signal is sampled at a frequency of 50 Hz when the PAL format is used or at 60 Hz when the NTSC format is used. Note that one period will be expressed by 1V or V hereinafter.

As the image quality and magnification become higher, addition of a function that allows the photographer to take a broad range of pictures is required. Especially, demands for ultra-low-speed zooming, i.e., so-called "artistic zooming", and ultra-high-speed zooming for changing the field angle from the telephoto end to the wide-angle end or vice versa as quick as possible are very large.

However, when the zooming speed is varied over a broad range from ultra high speed to ultra low speed, in case of ultra-low-speed zooming, blur is produced in practice, but the in-focus level obtained by the current sampling remains the same as the previous value in relation to the sampling period of an AF signal, and the cam loci cannot be changed. As a result, the control halts in a blur state. This problem occurs conspicuously when a stepping motor is used to drive the variator or focus lens, since such motor has a drive halt period.

Also, when the zooming speed is varied over a broad range from ultra high speed to ultra low speed, if the focus lens moving amount is corrected in consideration of the in-focus level alone without taking the zooming speed into consideration like in the conventional system, the focus lens moving amount remains the same irrespective of the zooming speed when the in-focus level remains the same, thus posing the following problem. For example, upon ultra-high-speed zooming, the focus lens moves too much and overshoots the in-focus cam locus to be selected, and blur stands out. By contrast, upon ultra-low-speed zooming, a long time is required until the in-focus cam locus is reached.

SUMMARY OF THE INVENTION

The present invention has been made in consideration of the above-mentioned problems, and has as its object to attain accurate cam trace with less labor and lower cost.

It is another object of the present invention to reliably detect deterioration of the in-focus level irrespective of the zooming speed.

It is still another object of the present invention to accurately and quickly correct the focus moving amount upon production of blur during zooming independently of the zooming speed.

In order to solve the above-mentioned problems and to achieve the above objects, an optical equipment according to the present invention is characterized by the following arrangement.

That is, there is provided an optical equipment for forming an object image on a predetermined plane via an optical system including a movable lens that moves along an optical axis, comprising lens drive means for driving the movable lens, first storage means for storing control information for controlling a position of the movable lens, second storage means for storing correction data for correcting the control data stored in the first storage means, and control means for controlling the lens drive means on the basis of the control information in the first storage means and the correction data in the second storage means.

A storage medium according to the present invention is characterized by the following arrangement.

That is, there is provided a computer-readable storage medium storing a program for executing a sequence for controlling driving of a movable lens using control information for controlling a position of the movable lens and correction data for correcting the control information.

A storage medium according to the present invention is characterized by the following arrangement.

That is, there is provided a computer-readable storage medium storing difference information between theoretical control information for controlling a position of a movable lens, and true control information.

A lens apparatus according to the present invention is characterized by the following arrangement.

That is, there is provided a lens apparatus comprising movable lens means for forming an object image on a predetermined plane while moving along an optical axis, drive means for driving the movable lens means, connection means for detachably attaching an external device, detection means for detecting attachment/detachment of the external device, first storage means for storing first control information for controlling a position of the movable lens means when the external device is attached, second storage means for storing second control information for controlling the position of the movable lens means when the external device is not attached, and control means for reading out contents of the first or second storage means in accordance with a detection result of the detection means, and controlling the drive means using the first or second control information.

A lens apparatus according to the present invention is characterized by the following arrangement.

That is, there is provided a lens apparatus comprising movable lens means for forming an object image on a predetermined plane while moving along an optical axis, drive means for driving the movable lens means, connection means for detachably attaching an external device, detection means for detecting attachment/detachment of the external device, first storage means for storing control information for controlling a position of the movable lens means when the external device is attached, second storage means for storing correction data for correcting the control information, and control means for reading out contents of the first and/or second storage means in accordance with a detection result of the detection means, and controlling the drive means using the control information when the external device is not attached or using control information obtained by correcting the control information by the correction data when the external device is attached.

A storage medium according to the present invention is characterized by the following arrangement.

That is, there is provided a computer-readable storage medium storing a program for executing a sequence of detecting if an external device is attached, and a sequence of controlling a position of a movable lens using first control information when it is detected that the external device is not attached, and controlling the position of the movable lens using second control information when it is detected that the external device is attached.

A storage medium according to the present invention is characterized by the following arrangement.

That is, there is provided a computer-readable storage medium storing a program for executing a sequence of detecting if an external device is attached, and a sequence of controlling a position of a movable lens using control information when it is detected that the external device is not attached, and controlling the position of the movable lens using control information obtained by correcting the control information by correction data when it is detected that the external device is attached.

A storage medium according to the present invention is characterized by the following arrangement.

That is, there is provided a computer-readable storage medium storing correction data for correcting control information that controls a position of a movable lens when an external device is attached to a lens apparatus having a movable lens.

A storage medium according to the present invention is characterized by the following arrangement.

That is, there is provided a computer-readable storage medium storing correction data for correcting control information that controls a position of a movable lens when an external apparatus is attached to a lens apparatus having the movable lens.

An imaging apparatus according to the present invention is characterized by the following arrangement.

That is, there is provided an imaging apparatus which has a lens system including a zoom lens group for changing a field angle and a focus compensation lens group having both a function of correcting a change in focal plane position upon movement of the zoom lens group and a focus adjustment function, and storage means for storing a locus that represents a positional relationship between the zoom lens group and focus compensation lens group in an in-focus state in correspondence with an object distance, and moves the zoom lens group and focus compensation lens group to trace the locus stored in the storage means upon zooming, comprising generation means for generating a video signal by photoelectrically converting an optical image obtained via the lens system, discrimination means for discriminating an in-focus level and a direction to drive to reach an in-focus point by detecting focus states at a predetermined period from the video signal generated by the generation means and comparing the focus states upon zooming, and determination means for determining the period on the basis of a moving speed of the zoom lens group.

An imaging method according to the present invention is characterized by the following arrangement.

That is, there is provided an imaging method for an imaging apparatus which has a lens system including a zoom lens group for changing a field angle and a focus compensation lens group having both a function of correcting a change in focal plane position upon movement of the zoom lens group and a focus adjustment function, and storage means for storing a locus that represents a positional relationship between the zoom lens group and focus compensation lens group in an in-focus state in correspondence with an object distance, and moves the zoom lens group and focus compensation lens group to trace the locus stored in the storage means upon zooming, comprising the generation step of generating a video signal by photoelectrically converting an optical image obtained via the lens system, the discrimination step of discriminating an in-focus level and a direction to drive to reach an in-focus point by detecting focus states at a predetermined period from the video signal generated in the generation step and comparing the focus states upon zooming, and the determination step of determining the period on the basis of a moving speed of the zoom lens group.

A storage medium according to the present invention is characterized by the following arrangement.

That is, there is provided a storage medium which is used in an imaging apparatus having a lens system including a zoom lens group for changing a field angle and a focus compensation lens group having both a function of correcting a change in focal plane position upon movement of the zoom lens group and a focus adjustment function, and storage means for storing a locus that represents a positional relationship between the zoom lens group and focus compensation lens group in an in-focus state in correspondence with an object distance, and which stores a program for moving the zoom lens group and focus compensation lens group to trace the locus stored in the storage means upon zooming, the program stored in the storage medium including a generation routine for generating a video signal by photoelectrically converting an optical image obtained via the lens system, a discrimination routine for discriminating an in-focus level and a direction to drive to reach an in-focus point by detecting focus states at a predetermined period from the video signal generated in the generation routine and comparing the focus states upon zooming, and a determination routine for determining the period on the basis of a moving speed of the zoom lens group.

A lens control apparatus according to the present invention is characterized by the following arrangement.

That is, there is provided a lens control apparatus comprising a zoom lens, a focus lens, focus detection means for detecting a focus state from a video signal at a predetermined period, focus control means for controlling the focus lens on the basis of an output from the focus detection means; and control means for changing the period on the basis of a moving speed of the zoom lens.

A lens control method according to the present invention is characterized by the following arrangement.

That is, there is provided a lens control method comprising the focus detection step of detecting a focus state from a video signal at a predetermined period in an imaging apparatus having a zoom lens and focus lens, the focus control step of controlling the focus lens on the basis of an output from the focus detection step, and the control step of changing the period on the basis of a moving speed of the zoom lens.

An imaging apparatus according to the present invention is characterized by the following arrangement.

That is, there is provided an imaging apparatus which has a lens system including a zoom lens group for changing a field angle and a focus compensation lens group having both a function of correcting a change in focal plane position upon movement of the zoom lens group and a focus adjustment function, and storage means for storing a locus that represents a positional relationship between the zoom lens group and focus compensation lens group in an in-focus state in correspondence with an object distance, and moves the zoom lens group and focus compensation lens group to trace the locus stored in the storage means upon zooming, comprising selection means for selecting the locus on the basis of positions of the zoom lens group and focus compensation lens group, detection means for detecting an in-focus level; and control means for determining a moving amount of the focus compensation lens group on the basis of the selected locus information, the in-focus level detected by the detection means upon zooming, and a moving speed of the zoom lens group.

An imaging method according to the present invention is characterized by the following arrangement.

That is, there is provided an imaging method for an imaging apparatus which has a lens system including a zoom lens group for changing a field angle and a focus compensation lens group having both a function of correcting a change in focal plane position upon movement of the zoom lens group and a focus adjustment function, and storage means for storing a locus that represents a positional relationship between the zoom lens group and focus compensation lens group in an in-focus state in correspondence with an object distance, and moves the zoom lens group and focus compensation lens group to trace the locus stored in the storage means upon zooming, comprising the selection step of selecting the locus on the basis of positions of the zoom lens group and focus compensation lens group, the detection step of detecting an in-focus level, and the control step of determining a moving amount of the focus compensation lens group on the basis of the selected locus information, the in-focus level detected in the detection step upon zooming, and a moving speed of the zoom lens group.

A storage medium according to the present invention is characterized by the following arrangement.

That is, there is provided a storage medium which is used in an imaging apparatus having a lens system including a zoom lens group for changing a field angle and a focus compensation lens group having both a function of correcting a change in focal plane position upon movement of the zoom lens group and a focus adjustment function, and storage means for storing a locus that represents a positional relationship between the zoom lens group and focus compensation lens group in an in-focus state in correspondence with an object distance, and which stores a program for moving the zoom lens group and focus compensation lens group to trace the locus stored in the storage means upon zooming, the program including a selection routine for selecting the locus on the basis of positions of the zoom lens group and focus compensation lens group, a detection routine for detecting an in-focus level, and a control routine for determining a moving amount of the focus compensation lens group on the basis of the selected locus information, the in-focus level detected in the detection routine upon zooming, and a moving speed of the zoom lens group.

A lens control apparatus according to the present invention is characterized by the following arrangement.

That is, there is provided a lens control apparatus comprising a zoom lens, a focus lens having a function of correcting a change in focal plane position upon movement of the zoom lens, storage means for storing a locus representing a positional relationship between the zoom lens and focus lens in an in-focus state in correspondence with an object distance, detection means for detecting an in-focus level, selection means for selecting the locus on the basis of position information of the zoom lens and focus lens, and control means for calculating a moving amount of the focus lens to move the focus lens according to the locus on the basis of the locus information selected by the selection means and the in-focus level detected by the detection means, and changing the moving amount of the focus lens in correspondence with a moving speed of the zoom lens.

A lens control apparatus according to the present invention is characterized by the following arrangement.

That is, there is provided a lens control apparatus comprising a zoom lens, a focus lens having a function of correcting a change in focal plane position upon movement of the zoom lens, storage means for storing a locus representing a positional relationship between the zoom lens and focus lens in an in-focus state in correspondence with an object distance, detection means for detecting an in-focus level, and control means for selecting the locus in accordance with position information of the zoom lens and focus lens, the in-focus level detected by the detection means, and a moving speed of the zoom lens, and controlling a moving amount which makes the focus lens trace the locus.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

The preferred embodiments of the present invention will be described in detail hereinafter with reference to the accompanying drawings.

First Embodiment

Figure 4:
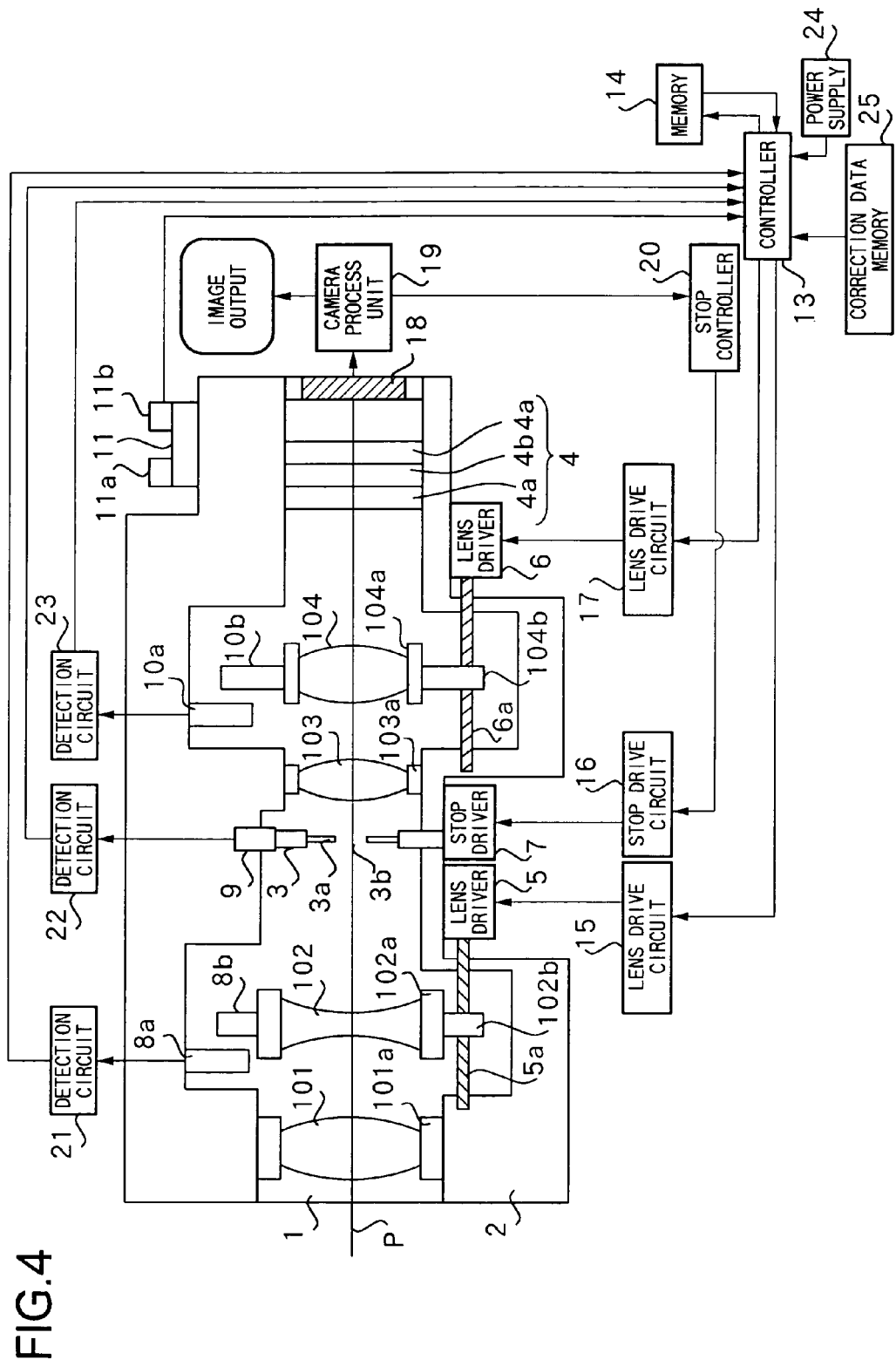
FIG. 4 is a diagram showing the arrangement according to the first embodiment of the present invention.

FIG. 4 is a schematic diagram showing principal part of an optical equipment according to the first embodiment of the present invention.

Referring to FIG. 4, reference numeral 1 denotes an optical system which is constructed by a 4-group rear-focus zoom lens (to be abbreviated as an "RFZ lens" hereinafter) including four lens groups. The RFZ lens 1 is constructed by a first lens group (to be referred to as a "front lens" hereinafter) 101 as a stationary lens group, a second lens group (to be referred to as a "variator" hereinafter) 102 as a movable lens group having a zooming function, a third lens group (to be referred to as an "afocal" hereinafter) 103 as a stationary lens group, and a fourth lens group (to be referred to as an "RR" hereinafter) 104 which is a movable lens group, and has a focusing function, and a compensator function of correcting variations of the image plane upon zooming of the variator 102. Reference symbol P denotes an optical axis of the optical system 1.

Note that each lens group is constituted by a plurality of lenses in practice. For example, in this embodiment, the front lens 101 has three lenses, the variator 102 three lenses, the afocal 103 a single lens, and the RR 104 two lenses; a total of nine lenses. However, the number of lenses of each lens group is not particularly limited.

Reference numeral 102a denotes a holding member (to be referred to as a "V moving ring" hereinafter) for holding the variator 102; and 104a, a holding member (to be referred to as an "RR moving ring" hereinafter) for holding the RR 104. These rings 102a and 104a are manufactured by molding or grinding using a plastic material such as polycarbonate or the like mixed with glass fiber.

Reference numeral 2 denotes a holding member (to be referred to as a "lens barrel" hereinafter) of the respective lens groups. The lens barrel 2 is manufactured by molding or grinding using a plastic material such as polycarbonate or the like.

Note that the lens barrel 2, and moving rings 102a and 104a may also be manufactured by die-casting a metal material such as aluminum, titanium, or the like, by secondary working after die-casting, or by directly grinding a block. Furthermore, the lens barrel 2 may be formed by dividing it into some pieces. For example, the lens barrel 2 may be formed by a plurality of members divided parallel or perpendicular to the optical axis P.

Reference numerals 101a and 103a denote holding members for fixing the front lens 101 and afocal 103 to the lens barrel 2. Note that the front lens 101 and afocal 103 may be directly fixed to the lens barrel 2 using, e.g., an adhesive. Reference numeral 18 denotes a photoelectric conversion element such as a CCD or the like.

Reference numeral 3 denotes a mechanical stop member for adjusting the amount of light that becomes incident on the photoelectric conversion element 18. In the mechanical stop member 3, aperture blades 3a are driven by a stop driver 7 comprising, e.g., an iG meter, stepping motor, or the like in a direction nearly perpendicular to the optical axis P, thereby varying the area of an aperture 3b. Reference numeral 9 denotes a stop encoder which detects the rotational angle of the iG meter. Reference numeral 22 denotes a detection circuit for detecting a signal output from the stop encoder 9; 16, a stop drive circuit; and 20, a stop controller. The mechanical stop member 3, stop driver 7, and stop encoder 9 construct a stop unit. However, the present invention is not limited to such specific stop unit. For example, a so-called solid-state stop having, e.g., an electrochromy function of controlling the transmittance of light by an electrochemical effect.

Reference numeral 4 denotes a filter unit placed in front of the photoelectric conversion unit 18. The filter unit 4 is composed of an optical low-pass filter 4a such as quartz, and an infrared cut filter 4b. These filters 4a and 4b are integrally placed in front of the photoelectric conversion element 18, but may be separately placed or may be inserted at arbitrary positions of the RFZ lens 1 where they are fully functional.

Reference numerals 5 and 6 denote lens drivers including stepping motors and the like for driving the movable lens groups 102 and 104. Reference numerals 5a and 6a denote lead screws, the surfaces of which have threads at a predetermined pitch. Reference numerals 102b and 104b denote racks, which are respectively formed integrally with the V and RR moving rings 102a and 104a. These racks 102b and 104b mesh with the lead screws 5a and 6a, and the V and RR moving rings 102a and 104b move parallel to the optical axis P upon forward/reverse rotation of the stepping motors 5 and 6, thereby moving the variator 102 and RR 104 parallel to the optical axis P.

Reference numerals 8a and 10a denote photointerrupters; and 8b and 10b, light-shielding plates, which are respectively formed integrally with the V and RR moving rings 102a and 104a by molding or grinding. When these light-shielding plates 8b and 10b reach the positions of the photointerrupters 8a and 10a upon movement of the V and RR moving rings 102a and 104a, signals output from the photointerrupters 8a and 10a change, and the reference positions (to be referred to as "lens initial reset positions" hereinafter) of the variator 102 and RR 104 are determined by detecting these changes. In this embodiment, by counting the number of drive pulses for driving each stepping motor with respect to the lens initial reset position, relative position information of each lens from the initial reset position is detected. Reference numerals 21 and 23 denote detection circuits for detecting signals output from the photointerrupters 8a and 10a.

Note that this embodiment uses a combination of a photointerrupter and light-shielding plate as lens initial reset position detection means. Instead, a combination of a Hall element and magnet, that of a PSD and iRED, and the like may be used.

Also, this embodiment uses a combination of a stepping motor and lens initial reset position detection means. Alternatively, a combination of a voice coil motor, DC motor, or the like, and lens position detection means comprising a combination of a magnetoresistive effect element and magnet, or the like may be used.

Reference numeral 13 denotes a controller for controlling the overall equipment; and 15 and 17, lens drive circuits for driving the lens drivers 5 and 6. Reference numeral 19 denotes a camera process unit for processing the output signal from the photoelectric conversion element 18 and outputting the processed signal as an image signal. Reference numeral 14 denotes a memory for storing control information shown in FIG. 1 for controlling the variator 102 and RR 104; and 25, a correction data memory which constructs a storage medium according to the present invention, that stores cam correction data for correcting the control information.

Reference numeral 11 denotes a zoom switch. A zoom switch 11a is pressed upon zooming toward the wide-angle end (to be referred to as "WIDE" hereinafter), and a zoom switch 11b is pressed upon zooming toward the telephoto end (to be referred to as "TELE" hereinafter). Upon depression of the zoom switch, the variator 102 and RR 104 are driven in accordance with drive signals from the controller 13 so as to attain zooming. Reference numeral 24 denotes a power supply.

Figure 1:
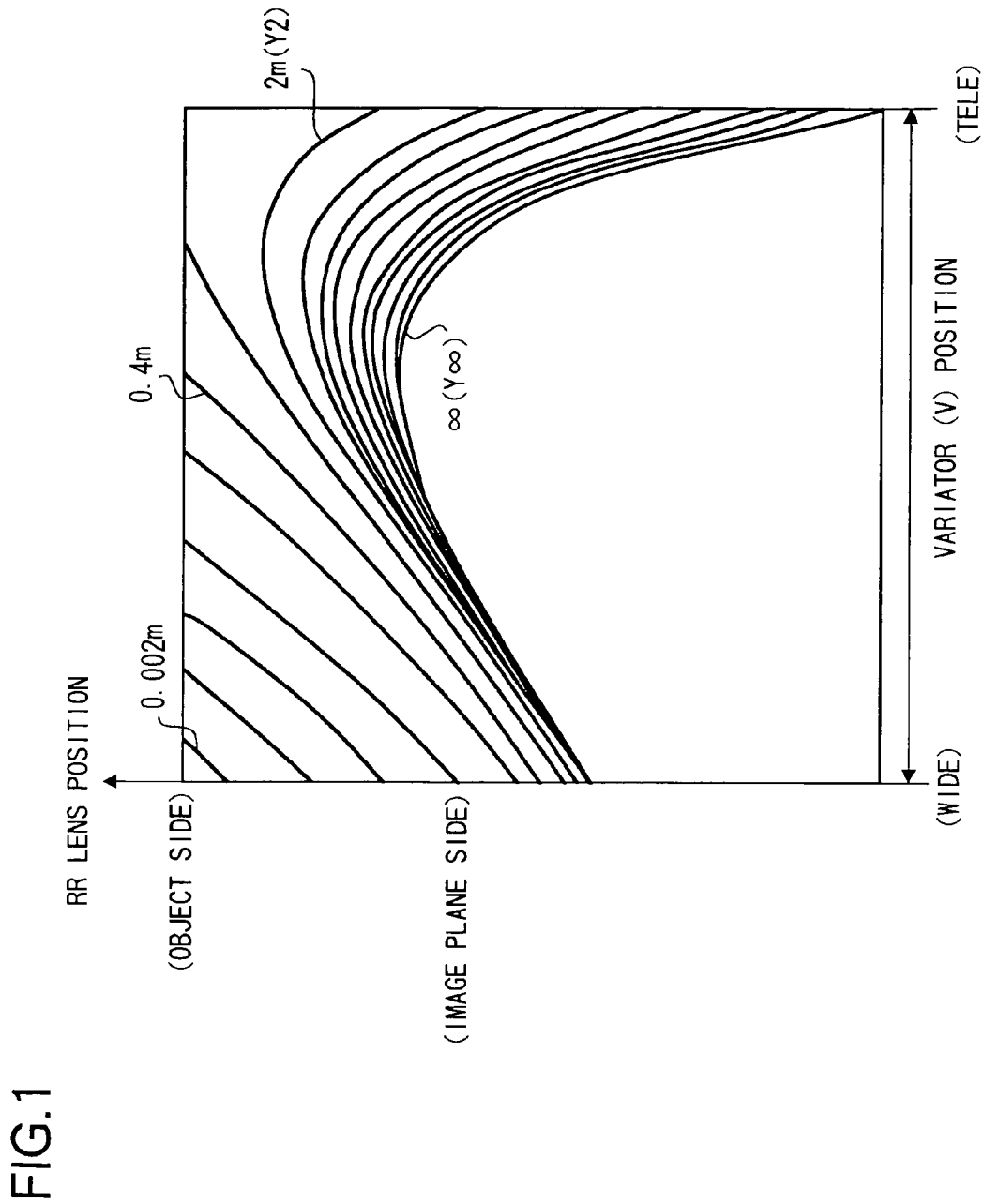
FIG. 1 is a graph showing cam loci.

FIG. 1 shows cam loci obtained by plotting the stop positions of the variator 102 and RR 104 on the optical axis in units of object distances.

In the RFZ lens 1, the stop position of the RR 104 on the optical axis is determined with respect to the lens stop position of the variator 102, i.e., zoom position, in units of object distances, so as to attain zooming while maintaining an in-focus state.

Referring to FIG. 1, for example, when the object distance is infinity (or 2 m), the RR lens 104 moves along convex locus curve Y∞ (or Y2) toward the object side upon movement of the variator 102 from WIDE to TELE on the optical axis.

Figure 5:
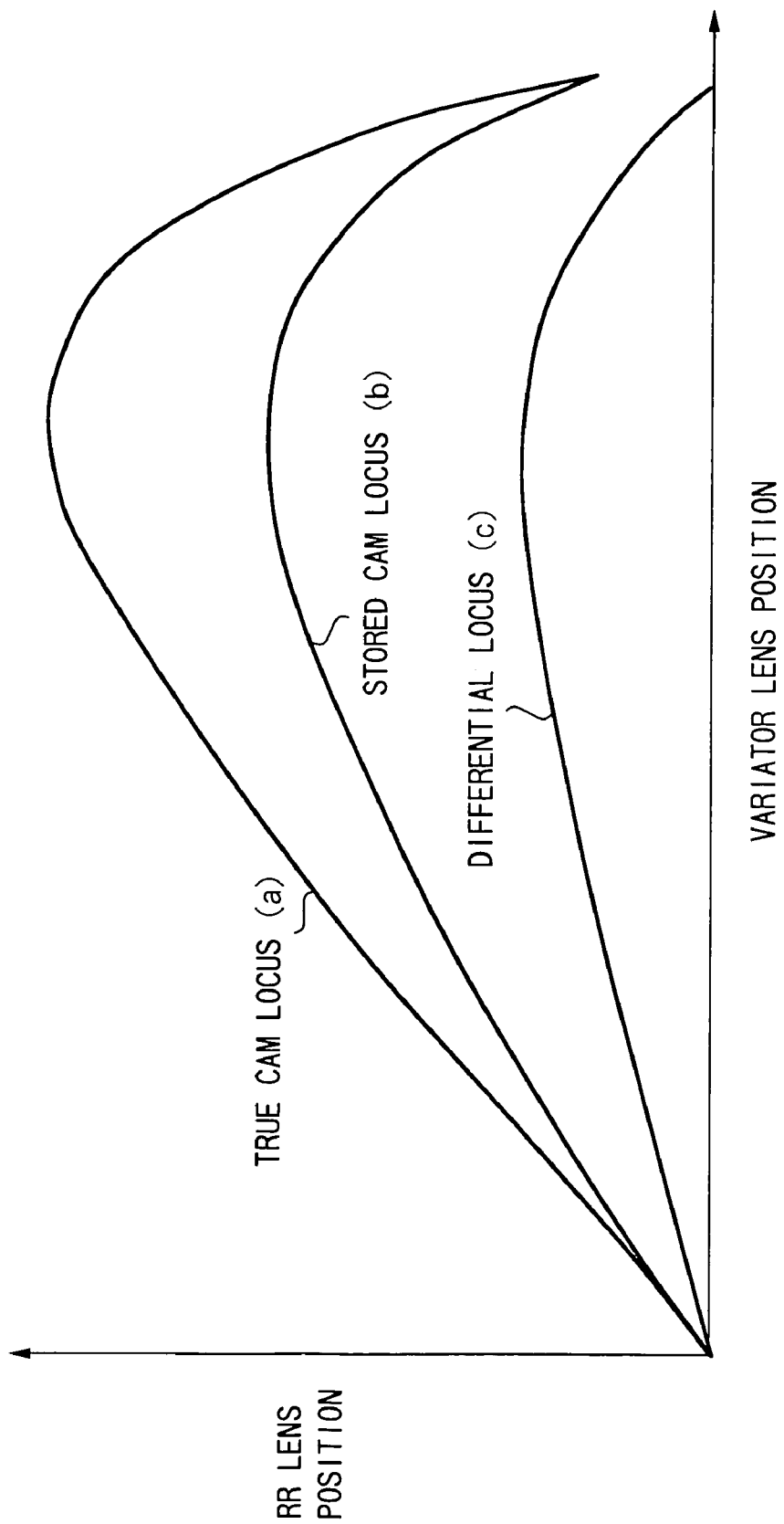
FIG. 5 is a graph for explaining cam correction data.

FIG. 5 is a graph that compares theoretically obtained cam locus (stored cam locus) b and true cam locus a after the manufacture. Note that the object distance the cam traces is arbitrary. As can be seen from FIG. 5, theoretical cam locus b and actual cam locus a have a difference. Differential locus c expresses that difference as a locus. When this differential locus c is stored in the correction data memory 25 as cam correction data, the theoretical cam locus matches the actual one, and high-precision cam trace free from blurring can be realized.

More specifically, the theoretical cam loci are stored as center values of the cam, and the cam correction data are also stored to correct deviations of the cam loci due to the aforementioned manufacturing errors and the like, thus realizing accurate cam trace.

Figure 6:
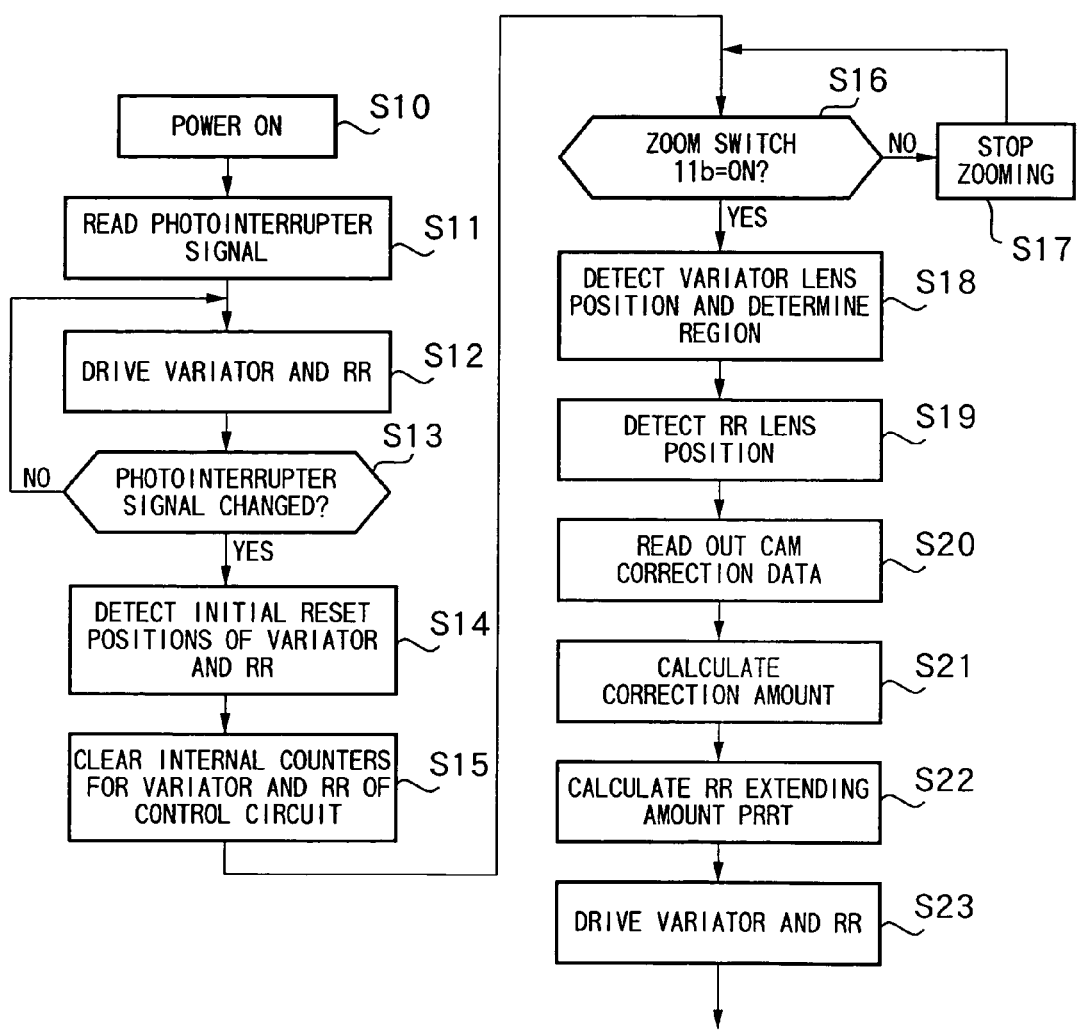
FIG. 6 is a flow chart of the first embodiment.

FIG. 6 is a flow chart showing the actual processing flow.

Initially, the power supply 24 is turned on (step S10). The signals output from the photointerrupters 8a and 10b are read via the detection circuits 21 and 23 (step S11). The controller 13 then drives the variator 102 and RR 104 in a direction corresponding to the read signals, i.e., in a direction to make the signals from the detection circuits 21 and 23 go low if the read signals are high, or vice versa (step S12). It is then checked if the signals from the photointerrupters 8a and 10a have changed (step S13). If the signals remain the same, the controller continues to drive; otherwise, the flow advances to step S14.

The positions of the variator 102 and RR 104 when the signals from the photointerrupters 8a and 10a have changed are determined as initial reset positions (step S14). The variator 102 and RR 104 are stopped at these positions where the signals have changed, and internal counters for the variator 102 and RR 104 in the controller 13 are cleared (step S15). These counters count drive pulses of the variator 102 and RR 104, thereby detecting the relative current positions of the variator 102 and RR 104 from their initial reset positions.

It is then checked if the zoom switch 11 is being pressed (step S16). If the zoom switch 11a is being pressed, zooming is made in the WIDE direction; if the zoom switch 11b is being pressed, zooming is made in the TELE direction. If the zoom switch 11b is not pressed, zooming is not done (step S17).

Zooming in the TELE direction will be explained below. Since zooming in the WIDE direction is controlled by the same routine, a description thereof will be omitted.

A position PV of the variator 102 is read out from the counter to search a divided region where the variator 102 is currently in, thereby determining a current region PVV of the variator 102 (step S18). Similarly, representative position data PRR of the RR 104 corresponding to the current region PVV of the variator 102 is read out from the counter (step S19).

Cam correction data is then read out from the correction data memory 25 (step S20). A correction amount T is then calculated in consideration of the positions of the RR and variator, or correction toward the closest-distance side or infinity side (step S21).

An extending amount PRRT is calculated (step S22) by:

$$PRRT = T + PRR \quad (1)$$

Note that T=0 when the actual cam locus matches the theoretical value. The variator 102 and RR 104 are driven according to the calculated data (step S23).

Note that the above description about zooming is premised on that auto-focusing is not activated during zooming. However, no problem is posed even when auto-focusing is activated.

According to this embodiment, for example, when the differences between the theoretical and actual cam loci have a given quantitative tendency in a mass-production lot, these differences are stored in the correction data memory 25 as cam correction data, thus realizing cam trace with much higher precision than that of the theoretical cam locus alone in the conventional system.

When the cam correction data (memory 25) are stored in a rewritable storage device, they can be easily changed in correspondence with mass-production lots, and this embodiment is very effective in terms of labor, schedule, and cost.

Note that the optical equipment may be constructed by a detachable camera apparatus and lens apparatus.

Second Embodiment

Figure 7:
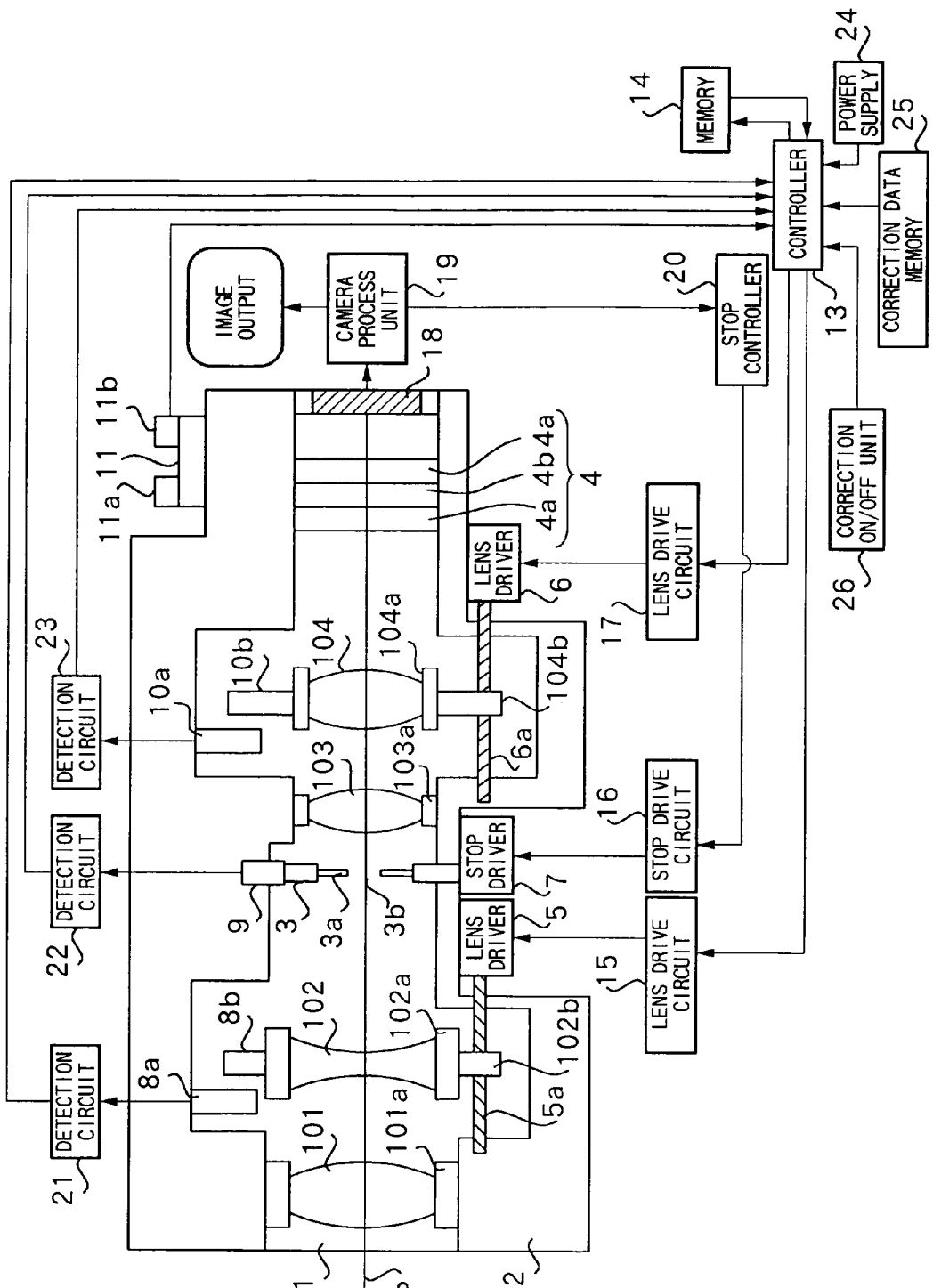
FIG. 7 is a diagram showing the arrangement according to the second embodiment of the present invention.

FIG. 7 is a block diagram showing the second embodiment of the present invention. The same reference numerals in FIG. 7 denote the same parts as in FIG. 4, and a repetitive description thereof will be avoided.

Referring to FIG. 7, reference numeral 26 denotes a cam correction ON/OFF unit, which can be implemented by either an external switch or a rewritable storage device.

This embodiment has as its object to easily cope with a situation where the need for arbitrary ON/OFF control of cam correction arises for various reasons, e.g., when sufficiently high performance can be assured without cam correction, when measurement is made upon comparing theoretical and actual cam loci, and so forth.

Figure 8:
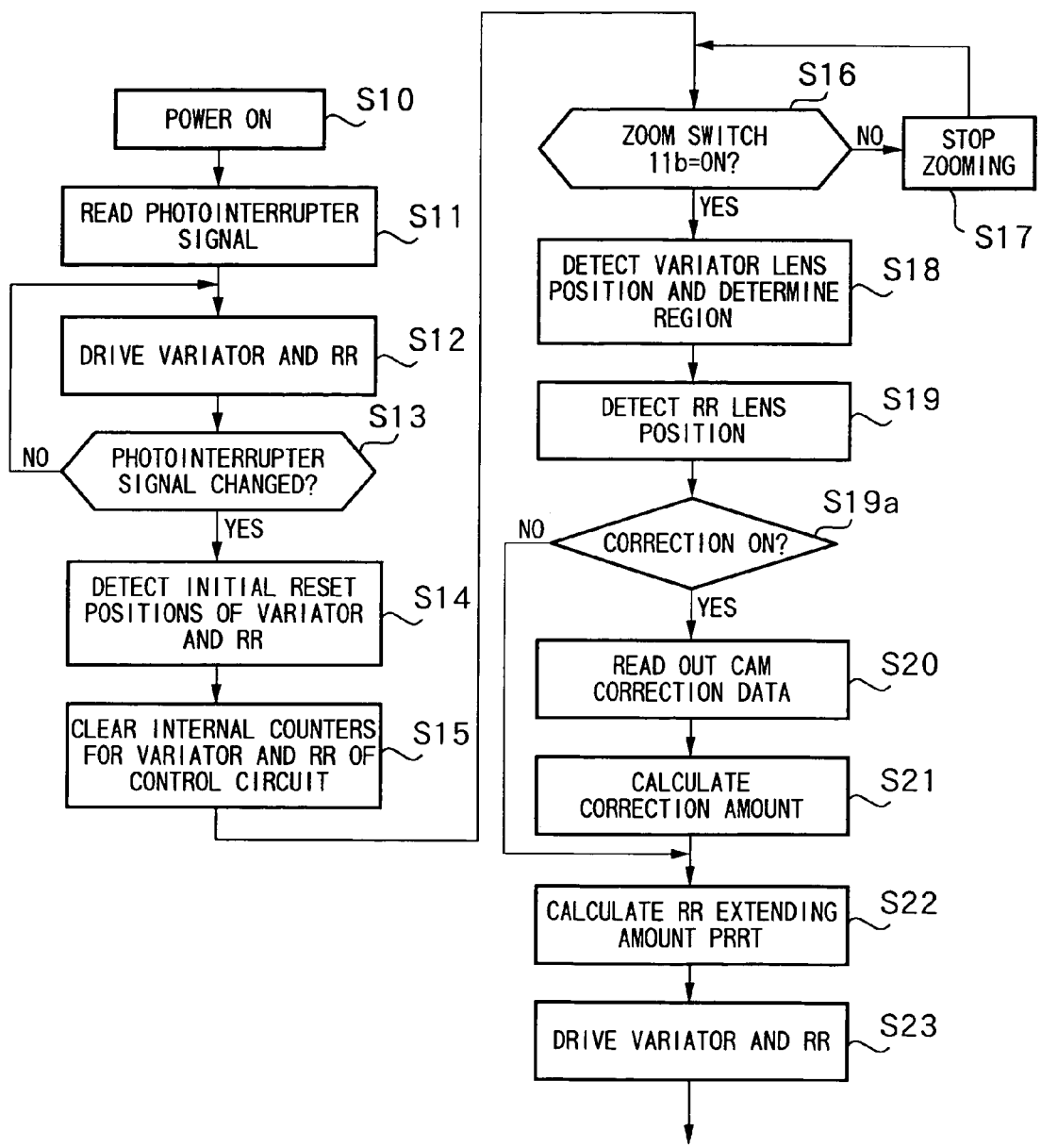
FIG. 8 is a flow chart of the second embodiment.

FIG. 8 is a flow chart of the processing of this embodiment.

In FIG. 8, step S19a is added after step S19 in the flow chart shown in FIG. 6. Hence, since other processes are the same as those in FIG. 6, a detailed description thereof will be omitted.

It is checked in step S19a if cam correction is ON. If NO in step S19a, the flow jumps to step S22 to calculate the RR extending amount; otherwise, the correction data is read out in step S20. Note that checking in step S19a may be made based on data pre-stored in a rewritable storage medium or on the positions of the variator and RR.

Third Embodiment

Figure 9:
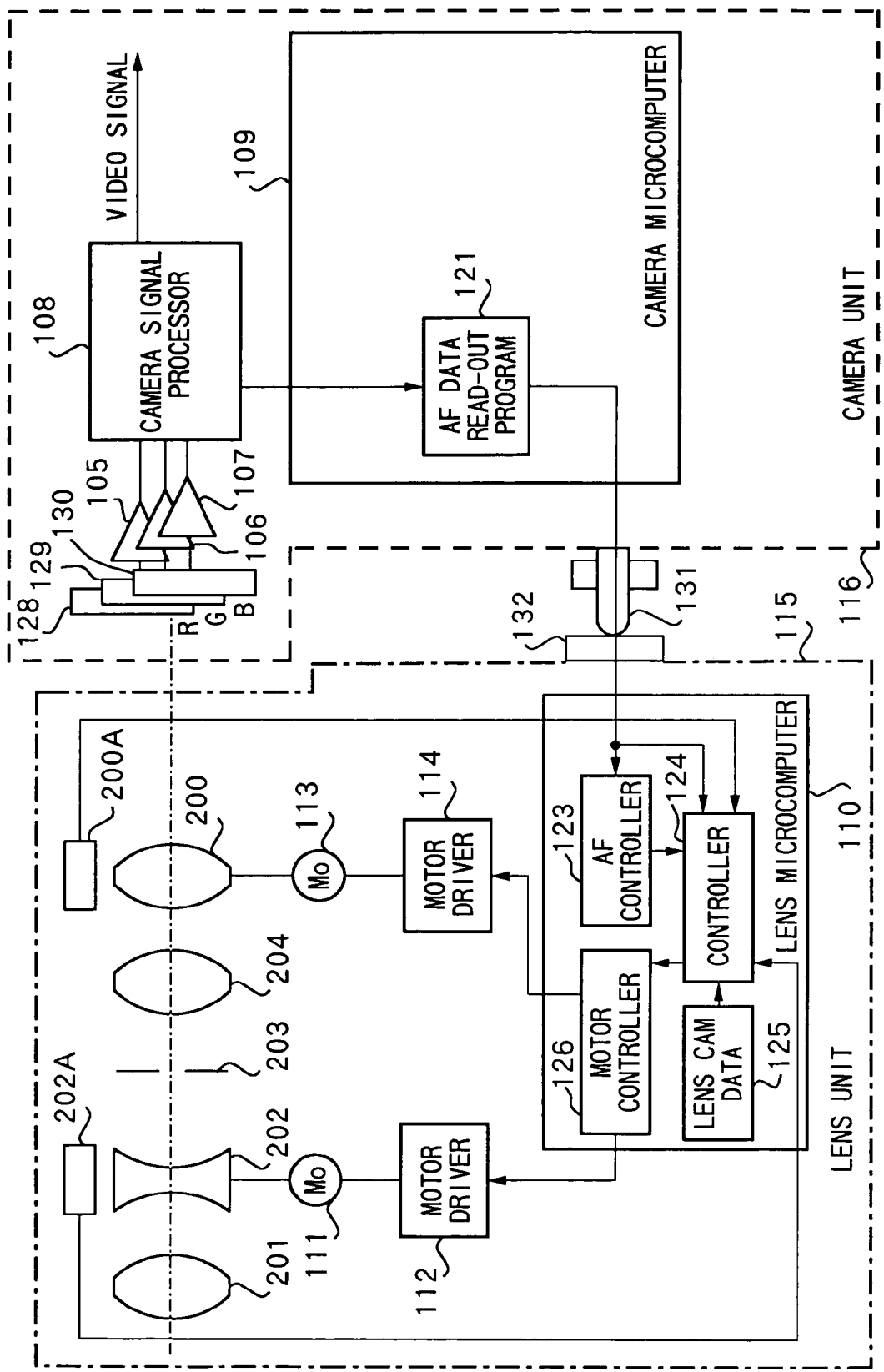
FIG. 9 is a diagram showing the arrangement according to the third embodiment of the present invention.

FIG. 9 shows the arrangement of a video camera which can exchange a lens, according to the third embodiment of the present invention.

Referring to FIG. 9, a lens unit 115 is detachably, electrically and mechanically connected to a camera unit 116 via contacts 131 and 132.

A light beam from an object is transmitted through a stationary first lens group 201, a variator lens group 202 as a second lens group that attains zooming, a stop 203, a stationary third lens group 204, and a focus lens group 200 as a fourth lens group having both a focus adjustment function and a compensation function of compensating for movement of the focal plane upon zooming. Then, red, green, and blue components as the three primary colors of the light beam respectively form images on imaging elements 128, 129, and 130 comprising, e.g., CCDs. The absolute positions of the variator lens group 202 and focus lens group 200 are respectively detected by absolute position detectors 202A and 200A such as encoders or the like, and the detected positions are supplied to a lens microcomputer 110.

The images on the respective imaging elements are photoelectrically converted into electrical signals, which are amplified to optimal levels by amplifiers 105, 106, and 107. Then, the amplified signals are input to a camera signal processing circuit 108 and are converted into a standard television signal. At the same time, AF information is read out as an AF evaluation value by a data read-out program 121 of a camera microcomputer 109.

The AF evaluation value read out by the camera microcomputer 109 is transferred to the lens microcomputer 110 via the camera contact 131 and lens contact 132 in combination with information of switches on the camera side, such as the ON/OFF state of an AF switch, the state of a zoom switch, and the like (these switches are not shown). If it is determined based on the information from the camera microcomputer 109 that the zoom switch is being pressed, the lens microcomputer 110 supplies a signal to a zoom motor driver 112 to drive the variator lens group 202 via a zoom motor 111 toward TELE or WIDE, i.e., in the direction the switch is being pressed. At the same time, a signal is supplied to a focus motor driver 114 using a program in a controller 124 on the basis of lens cam data 125 pre-stored in the lens microcomputer 110 to move the focus lens group 200 via a focus motor 113, thus attaining zooming free from any focus movement.

Figure 10:
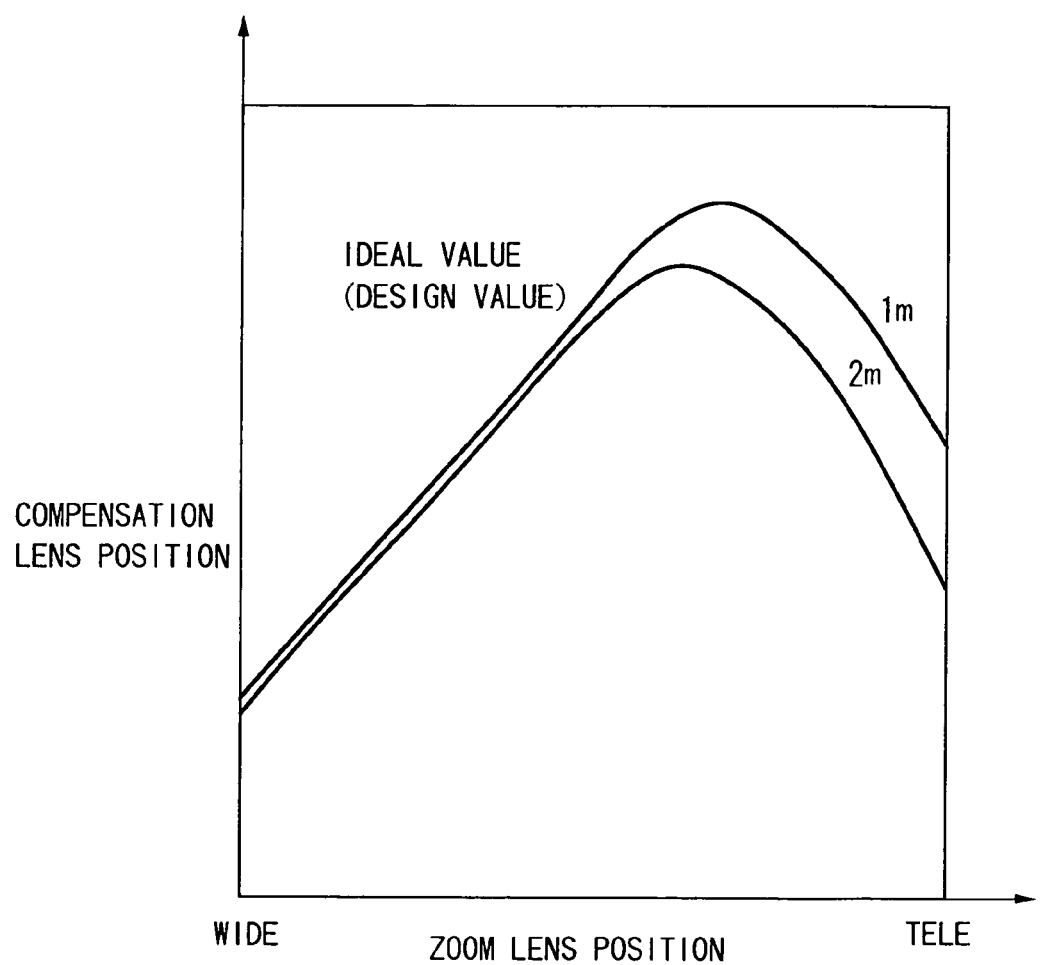
FIG. 10 is a graph showing the lens position of the third embodiment.

In a lens system in which a correction lens (focus lens) is placed behind a zoom lens (variator lens) on the optical axis, as shown in FIG. 9, the control position of the correction lens changes depending on the object distance while an in-focus state is maintained upon zooming. The lens cam data 125 stores the positions of the focus lens group 200 in units of a plurality of absolute positions of variator lens group 202 and in units of absolute positions of object distances (e.g., 1 m and 2 m in FIG. 10), as shown in FIG. 10. The program in the controller 124 determines the rotation direction and velocity of the focus motor 113 using the lens cam data 125 selected based on the absolute position data of the variator lens group 202 and focus lens group 200 detected by the position detectors 202A and 200A.

When the AF switch on the camera unit is ON, an AF controller 123 in the lens microcomputer 110 supplies a signal to the focus motor driver 114 via the controller 124 and a motor controller 126 to maximize the AF evaluation value from the camera microcomputer 109 and to move the focus lens group 200 alone, thus attaining automatic focus adjustment.

In this embodiment, in the video camera that can exchange a lens, the aforementioned cam trace calculation is made by the lens microcomputer 110. Hence, the processing is done in the same manner as that in the flow chart shown in FIG. 6 according to the first embodiment.

Fourth Embodiment

Figure 11:
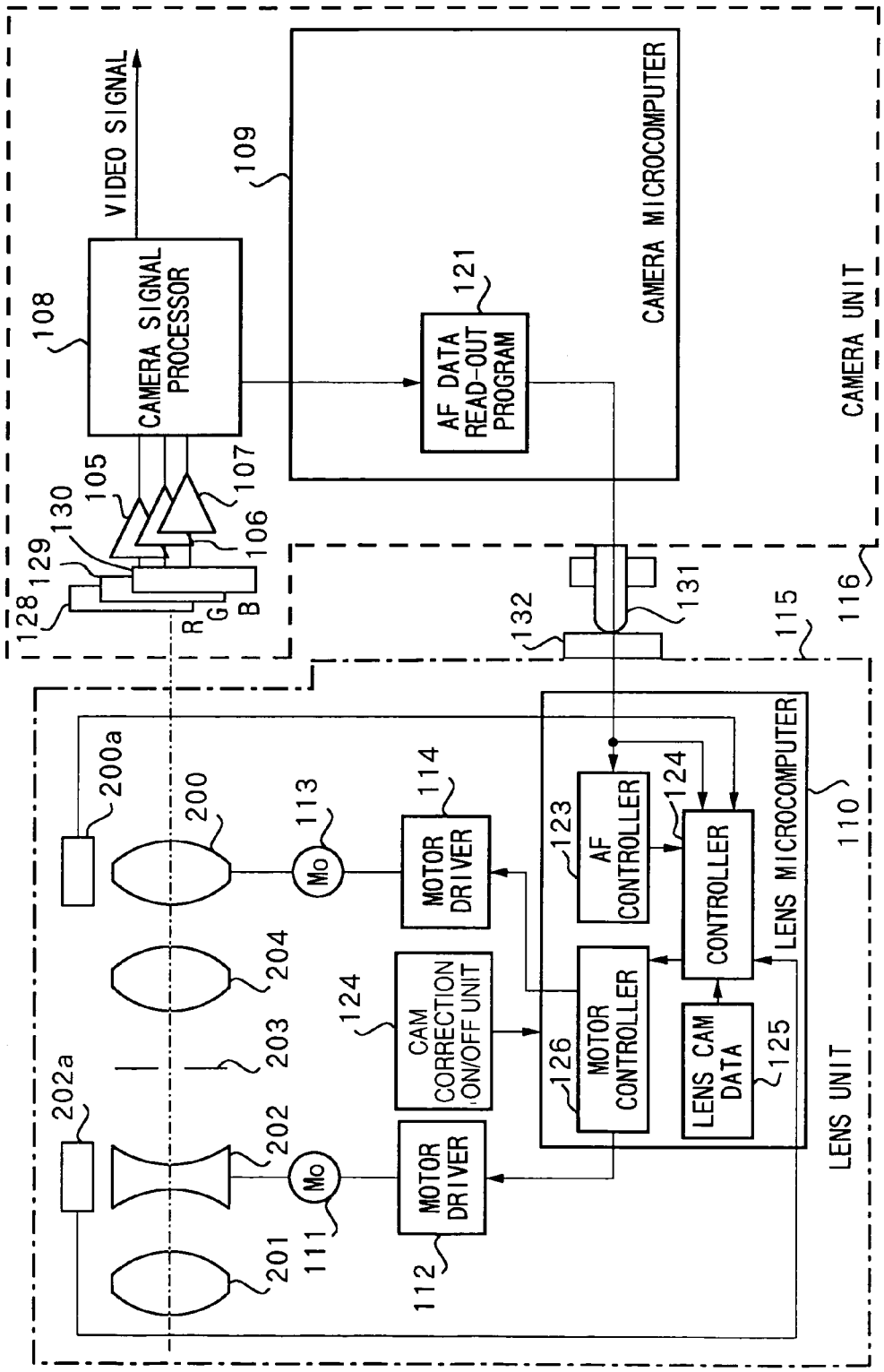
FIG. 11 is a diagram showing the arrangement according to the fourth embodiment of the present invention.

FIG. 11 shows the fourth embodiment of the present invention. In FIG. 11, a cam correction ON/OFF unit 124, which comprises an external switch or a rewritable storage device, is added to FIG. 9. This embodiment can easily cope with a situation where the need for arbitrary ON/OFF control of cam correction arises for various reasons, e.g., when sufficiently high performance can be assured without cam correction, when measurement is made upon comparing theoretical and actual cam loci, and so forth, as in the second embodiment. The processing is the same as that shown in FIG. 8.

Note that the system made up of the functional blocks shown in FIGS. 4, 7, 9, and 11 may be implemented by hardware or using a microcomputer system comprising a CPU, memory, and the like. When a microcomputer system is used, the memory constructs a storage medium according to the present invention. This storage medium stores a program for executing the processing shown in the flow chart in FIG. 6 or 8. For this storage medium and that as the correction data memory 25, a semiconductor memory such as a ROM, RAM, or the like, optical disk, magnetooptical disk, magnetic medium, and the like may be used, or they may be used as a CD-ROM, floppy disk, magnetic tape, nonvolatile memory card, and the like.

To restate, according to the first to fourth embodiments, since conventional control information is stored without any modification, and correction data for correcting deviations produced by, e.g., manufacturing errors are also stored, high-precision lens control can be done with less labor and lower cost by controlling lens driving using these data. Even when the image quality and magnification become higher in the future, blur will hardly be recognized.

Fifth Embodiment

Figure 12:
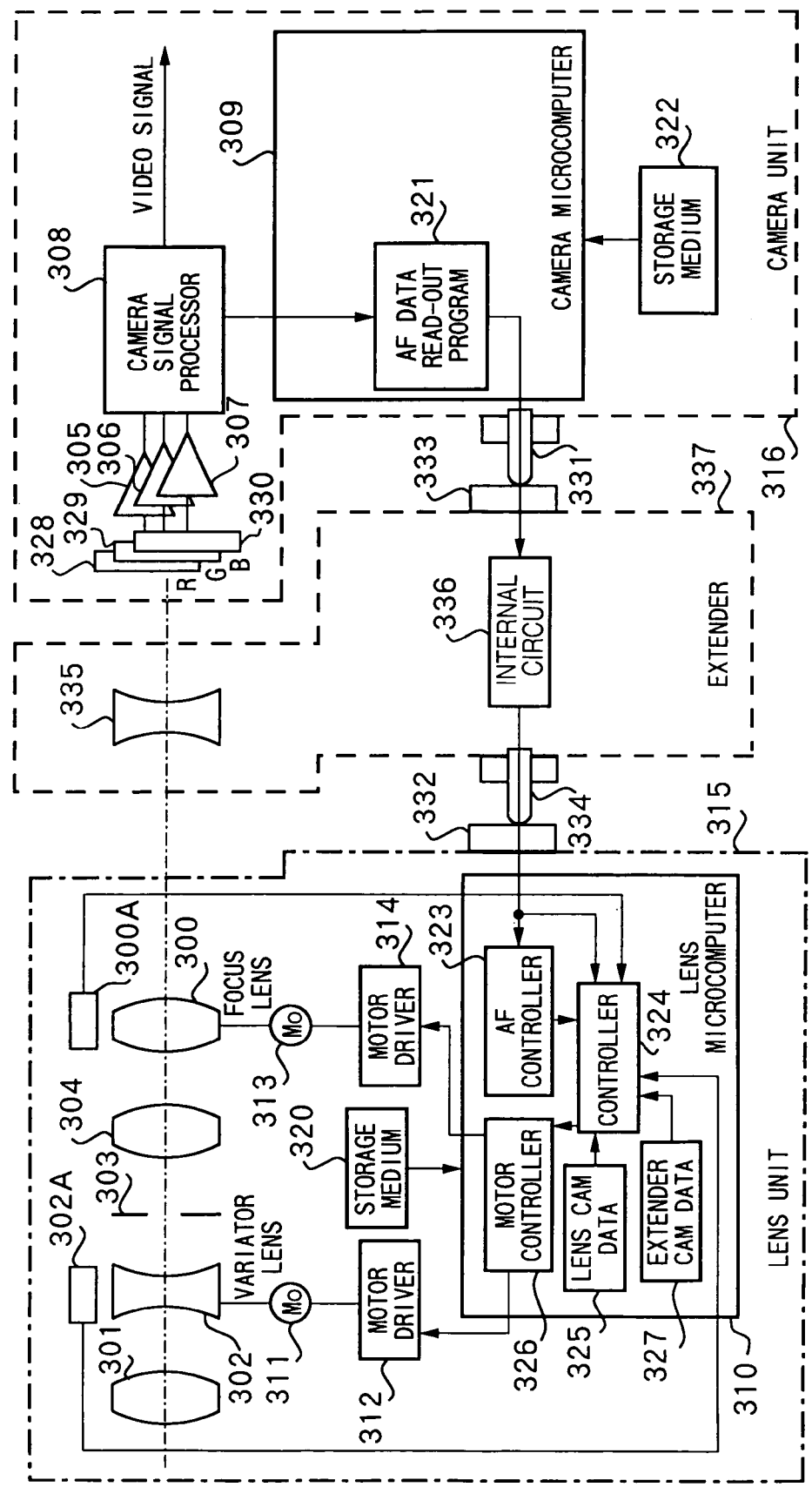
FIG. 12 is a diagram showing the arrangement according to the fifth embodiment of the present invention.

FIG. 12 is a diagram showing the arrangement of a video camera that can exchange a lens, according to the fifth embodiment of the present invention.

Referring to FIG. 12, a lens unit 315 is detachably attached to a camera unit 316 via an extender 337. The lens unit 315 has a lens contact 332, the extender 337 has an extender lens contact 334 and extender camera contact 333, and the camera unit 315 has a camera contact 331.

A light beam from an object is transmitted through a stationary first lens group 301, a variator lens group (to be referred to as a variator hereinafter) 302 as a second lens group that attains zooming, a stop 303, a stationary third lens group 304, and a focus lens group (to be referred to as an RR hereinafter) 300 as a fourth lens group having both a focus adjustment function and a compensation function of compensating for movement of the focal plane upon zooming, and is also transmitted through an extender lens group 335 for zooming in the extender 337. Then, red, green, and blue components as the three primary colors of the light beam respectively form images on imaging elements 328, 329, and 330 comprising, e.g., CCDs.

The absolute positions of the variator 302 and RR 300 are respectively detected by absolute position detectors 302A and 300A such as encoders or the like, and the detected positions are supplied to a lens microcomputer 310. The images on the respective imaging elements 328 to 330 are photoelectrically converted into electrical signals, which are amplified to optimal levels by amplifiers 305, 306, and 307. Then, the amplified signals are input to a camera signal processing circuit 308 and are converted into a standard television signal. At the same time, AF information is read out as an AF evaluation value by a data read-out program 321 of a camera microcomputer 309.

The AF evaluation value read out by the camera microcomputer 309 is transferred to the microcomputer 310 via the camera contact 331, the extender camera contact 333, an extender internal circuit 336, the extender lens contact 334, and the lens contact 332 together with information of switches on the camera side such as the ON/OFF state of an AF switch, the state of a zoom switch, and the like (these switches are not shown).

If it is determined based on information from the camera microcomputer 309 that the zoom switch is being pressed, the lens microcomputer 310 supplies a signal to a zoom motor driver 312 to drive the variator 302 via a zoom motor 311 toward TELE or WIDE, i.e., in the direction the switch is being pressed. At the same time, a motor controller 326 supplies a signal to a focus motor driver 314 using a program in a controller 324 on the basis of lens cam data 325 pre-stored in the lens microcomputer 310 to move the RR 300 via a focus motor 313, thus attaining zooming free from any focus movement.

When the AF switch on the camera unit is ON, an AF controller 323 in the lens microcomputer 310 supplies a signal to the focus motor driver 314 via the controller 324 and motor controller 326 to maximize the AF evaluation value from the camera microcomputer 309 and to move the RR 300 alone, thus attaining automatic focus adjustment.

When the stop positions of the variator 302 and RR 300 on the optical axis are plotted in units of object distances, the above-mentioned graph shown in FIG. 1 is obtained.

Referring to FIG. 1, for example, when the object distance is infinity (or 2 m), the RR lens 300 moves along convex locus Y∞ (or Y2) toward the object side upon movement of the variator from WIDE to TELE on the optical axis. As described above, upon zooming from WIDE toward TELE or vice versa, driving of the variator 302 and RR 300 is controlled to trace the cam locus in correspondence with the object distance, thus obtaining a good image free from any blur.

Figure 13:
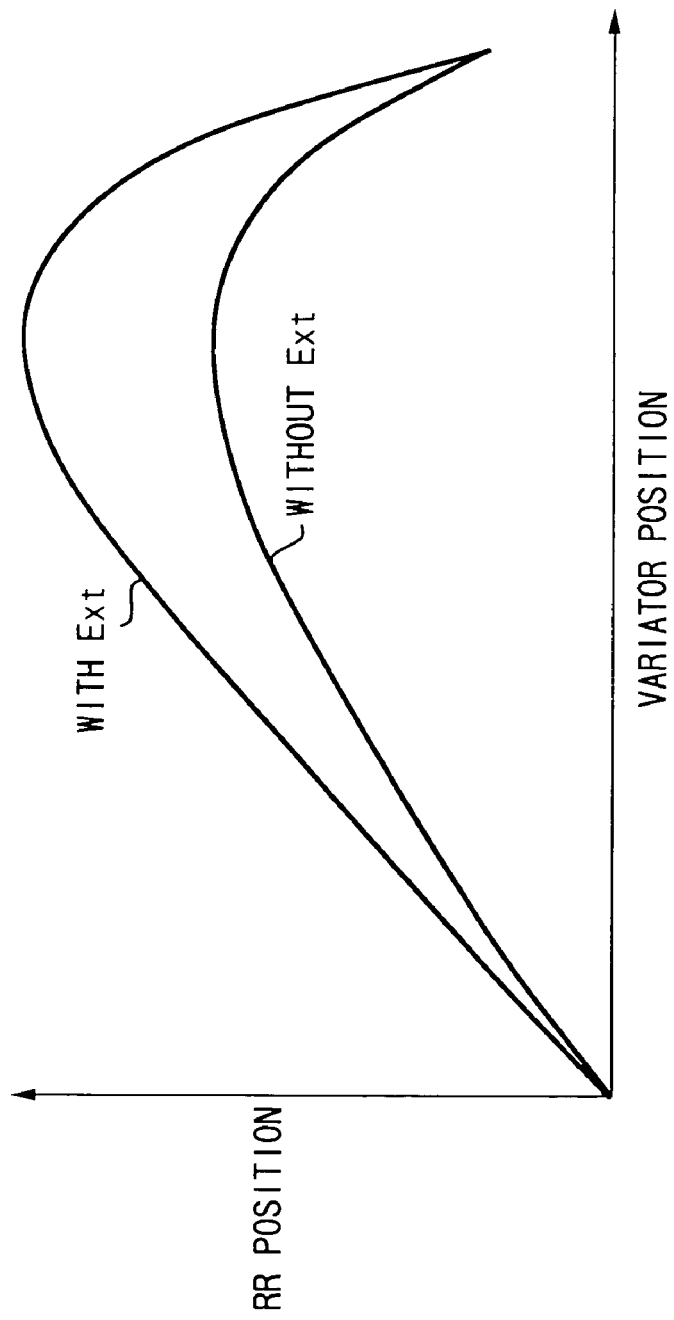
FIG. 13 is a graph showing cam loci with and without an extender attached.

However, as shown in FIG. 13, a cam locus used when the lens unit 315 alone has a large difference from that used upon attaching the extender 337 (with and without Ext: Ext represents the extender). The cam loci shown in FIG. 13 are obtained by plotting the stop positions of the variator 302 and RR 300 on the optical axis for a given identical object distance.

In order to solve this problem, in this embodiment, whether or not the extender is attached is detected, and optical and mechanical changes in cam locus by the extender 337 attached are stored in advance, thus attaining high-precision cam trace by a method that requires less labor and lower cost.

More specifically, when the extender 337 is attached, the lens microcomputer 310 controls by reading out extender cam data 327 upon attachment of the extender, which is different from cam data used for the lens unit 315 alone, thereby realizing satisfactory cam trace free from blurring even when the extender is attached.

Figure 14:
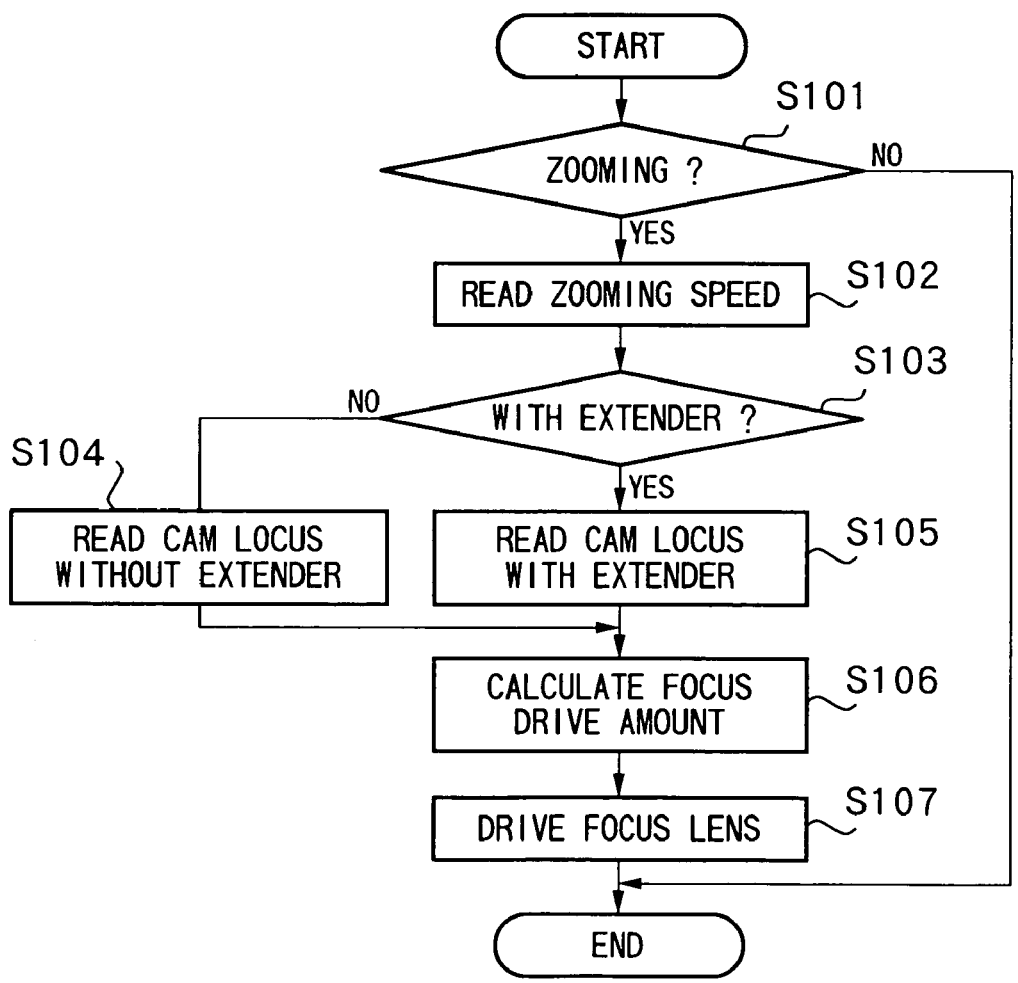
FIG. 14 is a flow chart of the fifth embodiment.

FIG. 14 is a flow chart showing the actual flow.

After power ON, predetermined reset operations of both the variator 302 and RR 300 are performed to detect the positions of these lens for cam trace. In this case, internal counters are initialized by the reset operations to prepare for control.

It is checked in step S101 if a zoom drive command is detected. If NO in step S101, zooming is not made. A drive command means may be placed in either the lens unit 315 or the camera unit 316. If YES in step S101, the zooming speed is read in step S102. The drive command means may designate an arbitrary speed depending on its shape, or a fixed speed may be designated. That is, the present invention is not limited to a specific speed.

It is then checked in step S103 if the extender 337 is attached. A signal from the camera unit 316 is input to the lens microcomputer 310 via the contacts 331, 333, and 334. The lens microcomputer 310 can determine attachment of the extender 337 using the extender internal circuit 336.

If the extender 337 is not attached, the lens cam data 325 as cam locus data for the lens unit 315 alone is read from a memory in step S104.

If the extender 337 is attached, the extender cam data 327 as cam locus data with the extender is read from the memory in step S105. The extending amount of the RR 300 is calculated in step S106, and the variator 302 and RR 300 are driven on the basis of the calculated data in step S107.

Note that the above description about zooming is premised on that auto-focusing is not activated during zooming. However, no problem is posed even when auto-focusing is activated.

Sixth Embodiment

Figure 15:
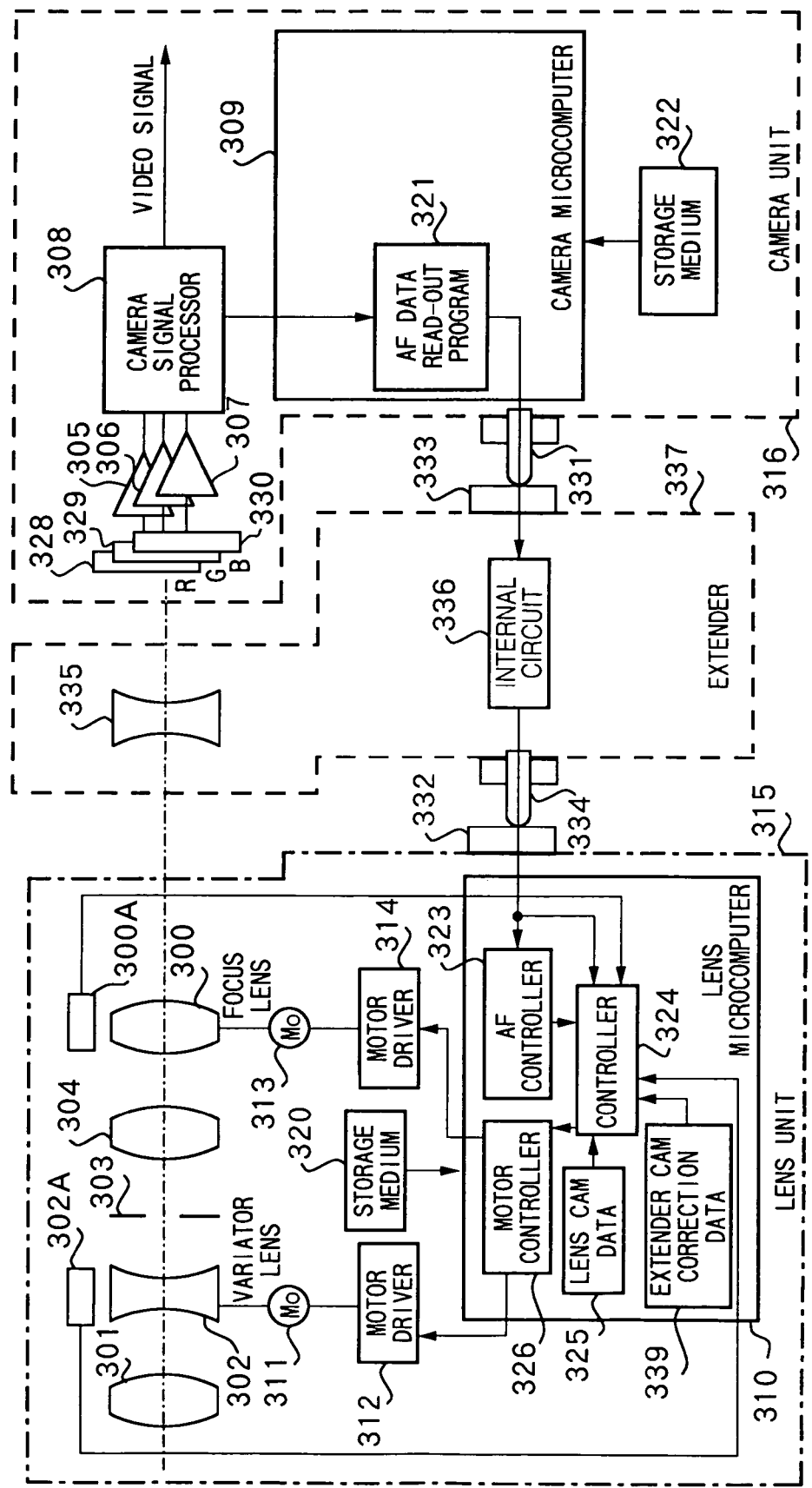
FIG. 15 is a diagram showing the arrangement according to the sixth embodiment of the present invention.

FIG. 15 shows the sixth embodiment of the present invention.

The arrangement shown in FIG. 15 is substantially the same as that shown in FIG. 12, except that extender cam correction data 339 is stored in place of the extender cam data 327 in FIG. 12.

Figure 16:
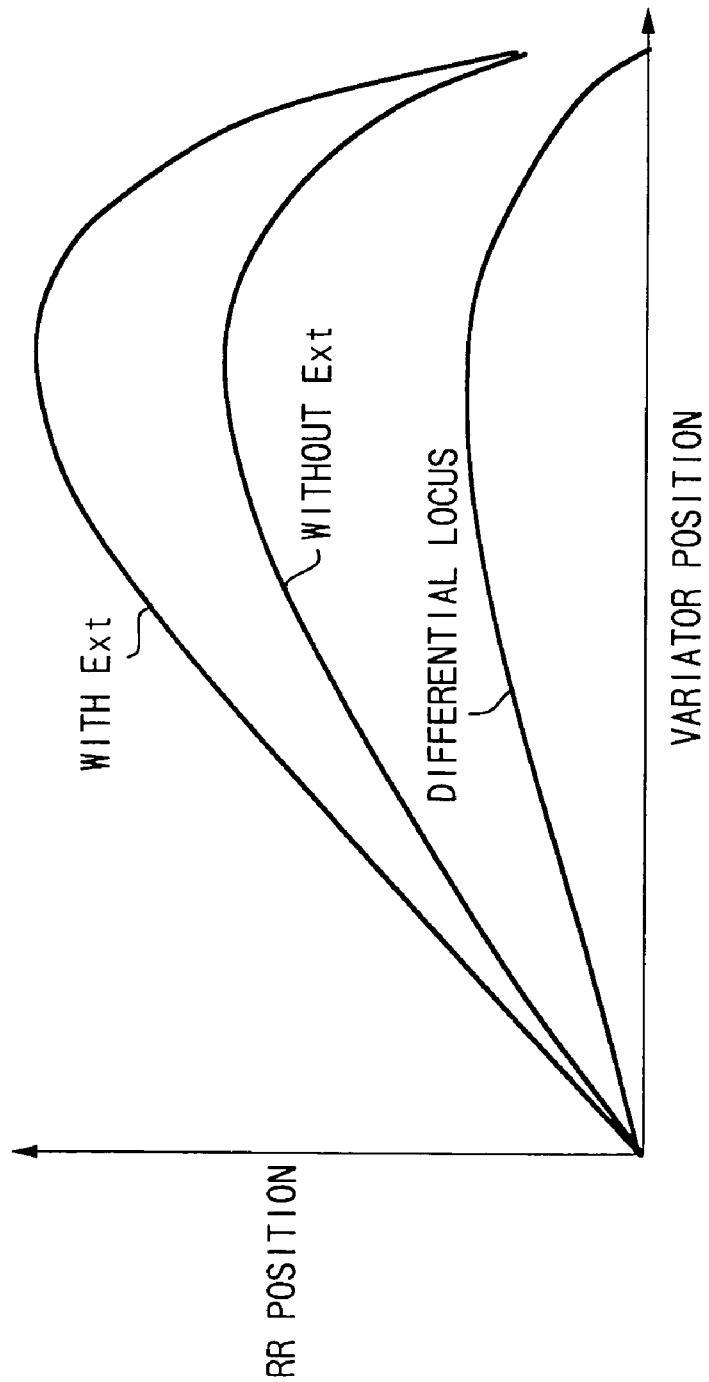
FIG. 16 is a graph for explaining cam correction data.

FIG. 16 is a graph that plots the stop positions of the variator 302 and RR 300 on the optical axis for a given identical object distance. As can be seen from FIG. 16, a cam locus for the lens unit 316 alone has a large difference from that upon attaching the extender. Note that the cam traces an arbitrary object distance in FIG. 16. Also, a differential locus in FIG. 16 indicates the difference between the two loci.

When this differential locus is stored as the extender cam correction data 339 as another cam correction locus data, the theoretical cam locus can match the actual one, and ideal cam trace free from any blurring can be realized.

In this embodiment, whether or not the extender is attached is detected, and optical and mechanical changes in cam locus by the extender 337 attached can be corrected by storing both the cam locus data (lens cam data 325) for the lens unit 315 alone, and the extender cam data 339 for correcting these data, thus realizing high-precision cam trace that requires less labor and lower cost.

Figure 17:
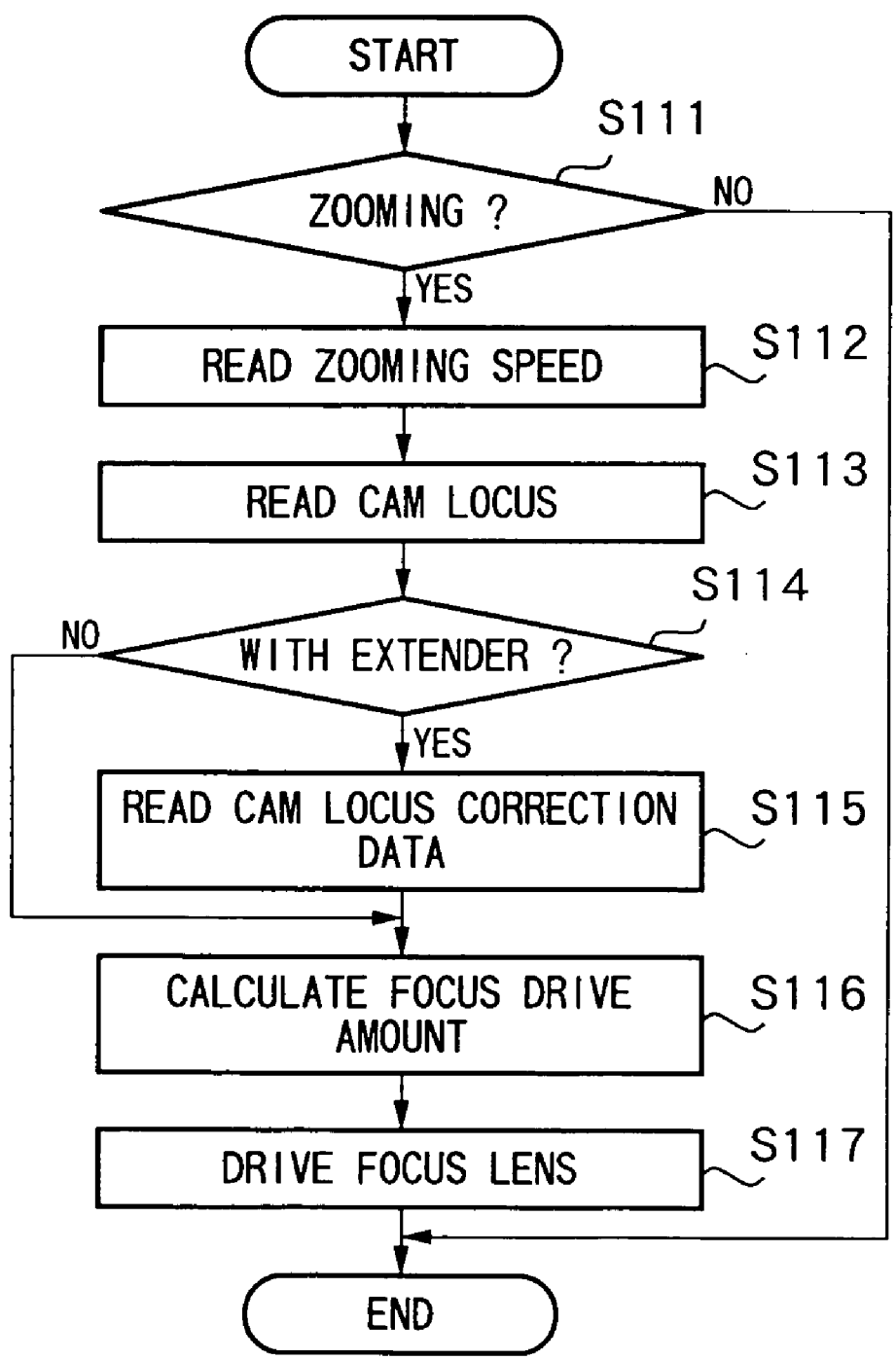
FIG. 17 is a flow chart of the sixth embodiment.

FIG. 17 is a flow chart showing the actual flow.

Steps S111 and S112 after the start are executed in the same manner as in steps S101 and S102 in FIG. 14. In step S113, the lens cam data 325 is read. It is then checked in step S114 if the extender 337 is attached. A signal from the camera unit 316 is input to the lens microcomputer 310 via the contacts 331, 333, 334, and 332. The lens microcomputer 310 can determine attachment of the extender 337 by using the internal circuit 336. If the extender 337 is attached, the extender cam correction data 339 for a case with the extender is read in step S115.

In step S116, the extending amount of the RR 300 is calculated by:

$$PRRT = T + PRR \quad (2)$$

In this case, the correction amount is calculated in consideration of the positions of the RR 300 and variator 302, or correction toward the closest-distance side or infinity side. Of course, T=0 when the cam locus upon attachment of the extender 337 matches that without the extender. In step S117, the variator 302 and RR 300 are driven based on the calculated data.

Note that the above description about zooming is premised on that auto-focusing is not activated during zooming. However, no problem is posed even when auto-focusing is activated.

When the extender cam correction data 328 are stored in a rewritable storage device, they can be easily changed in correspondence with mass-production lots, and this embodiment is very effective in terms of labor, schedule, and cost.

Seventh Embodiment

Figure 18:
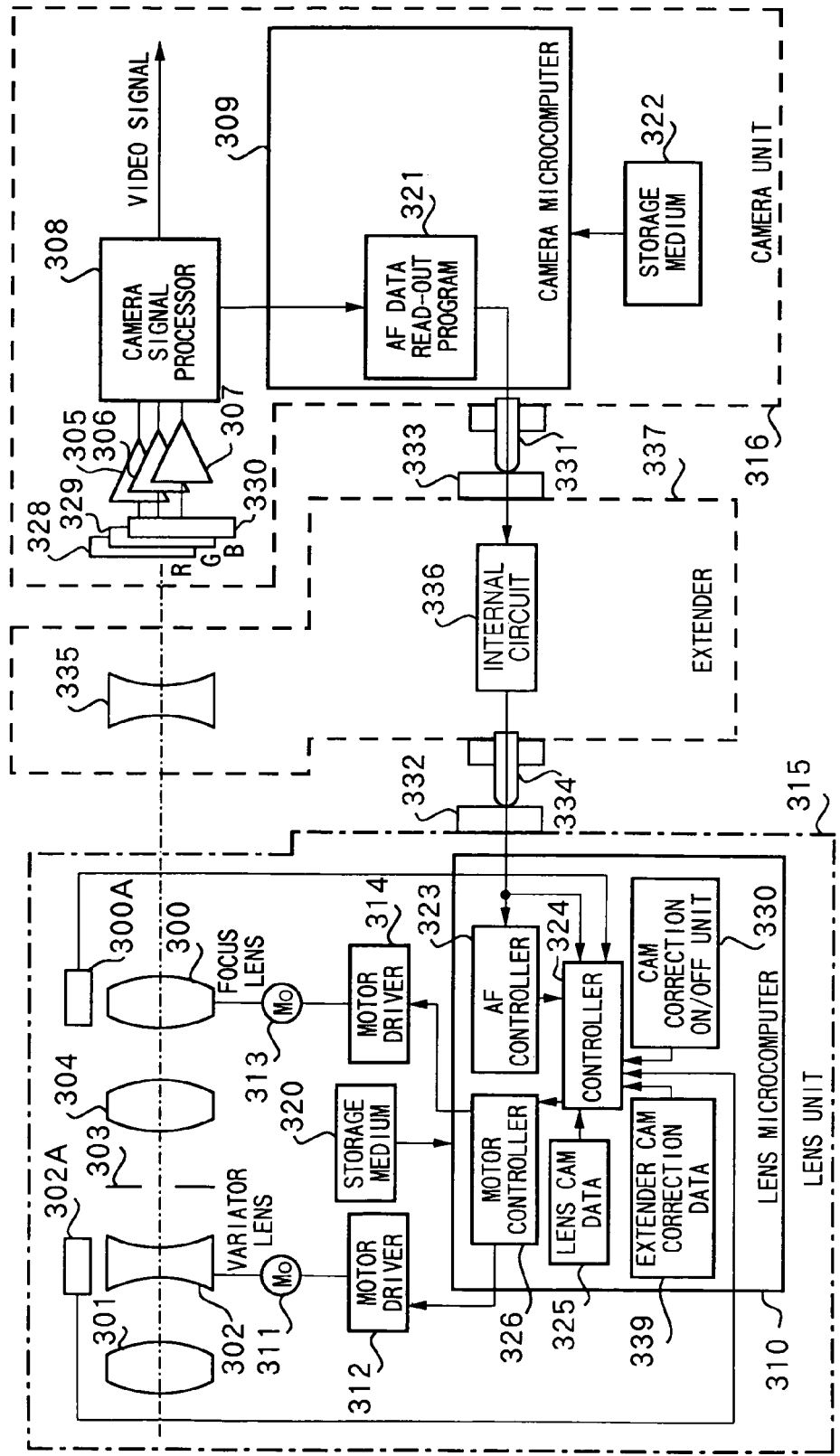
FIG. 18 is a diagram showing the arrangement according to the seventh embodiment of the present invention.

FIG. 18 shows the seventh embodiment of the present invention. In FIG. 18, a cam correction ON/OFF unit 330 upon attachment of the extender is added to FIG. 15. The cam correction ON/OFF unit 330 can be implemented by either an external switch or a rewritable storage device.

This embodiment can easily cope with a situation where the need for arbitrary ON/OFF control of cam correction arises for various reasons, e.g., when sufficiently high performance can be assured without correcting cam trace for the lens unit 315 alone upon attachment of the extender 337, when measurement is made upon comparing cam loci with and without the extender attached, and so forth.

Figure 19:
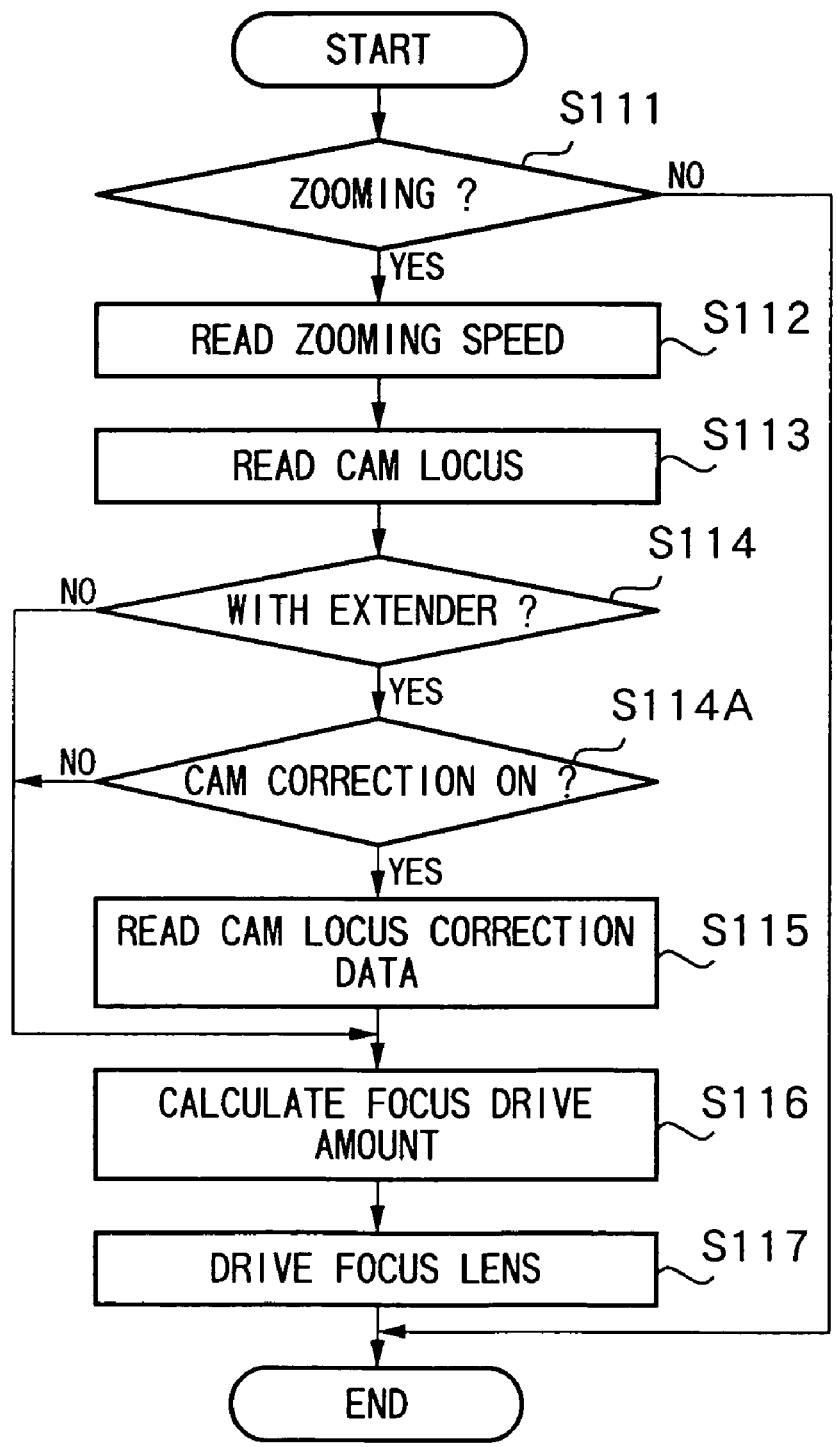
FIG. 19 is a flow chart of the seventh embodiment.

FIG. 19 shows the flow. In FIG. 19, step S114A is inserted after step S114 in FIG. 17. It is checked in step S114A if cam correction is ON when the extender is attached. If NO in step S114A, the flow jumps to step S116 to calculate the RR extending amount; otherwise, the extender cam correction data 330 is read out in step S115. Note that checking in step S114A may be made based on data pre-stored in a rewritable storage medium or on the positions of the variator and RR.

In the above description, auto-focusing may be activated during zooming.

Note that storage media 320 and 322 shown in FIGS. 12, 15, and 18 store programs for executing the processing shown in the flow charts shown in FIGS. 14, 17, and 19. As the storage medium, a semiconductor memory such as a ROM, RAM, or the like, optical disk, magnetooptical disk, magnetic medium, and the like may be used, and they may be used as a CD-ROM, floppy disk, magnetic tape, non-volatile memory card, and the like.

To reiterate, according to the fifth to seventh embodiments, since control information of a movable lens upon attachment of an external device such as an extender or correction data for correcting the control information is stored, high-precision cam trace can be realized with less labor and lower cost. Also, even when the image quality and magnification become higher in the future, blur will hardly be recognized.

Eighth Embodiment

Figure 20:
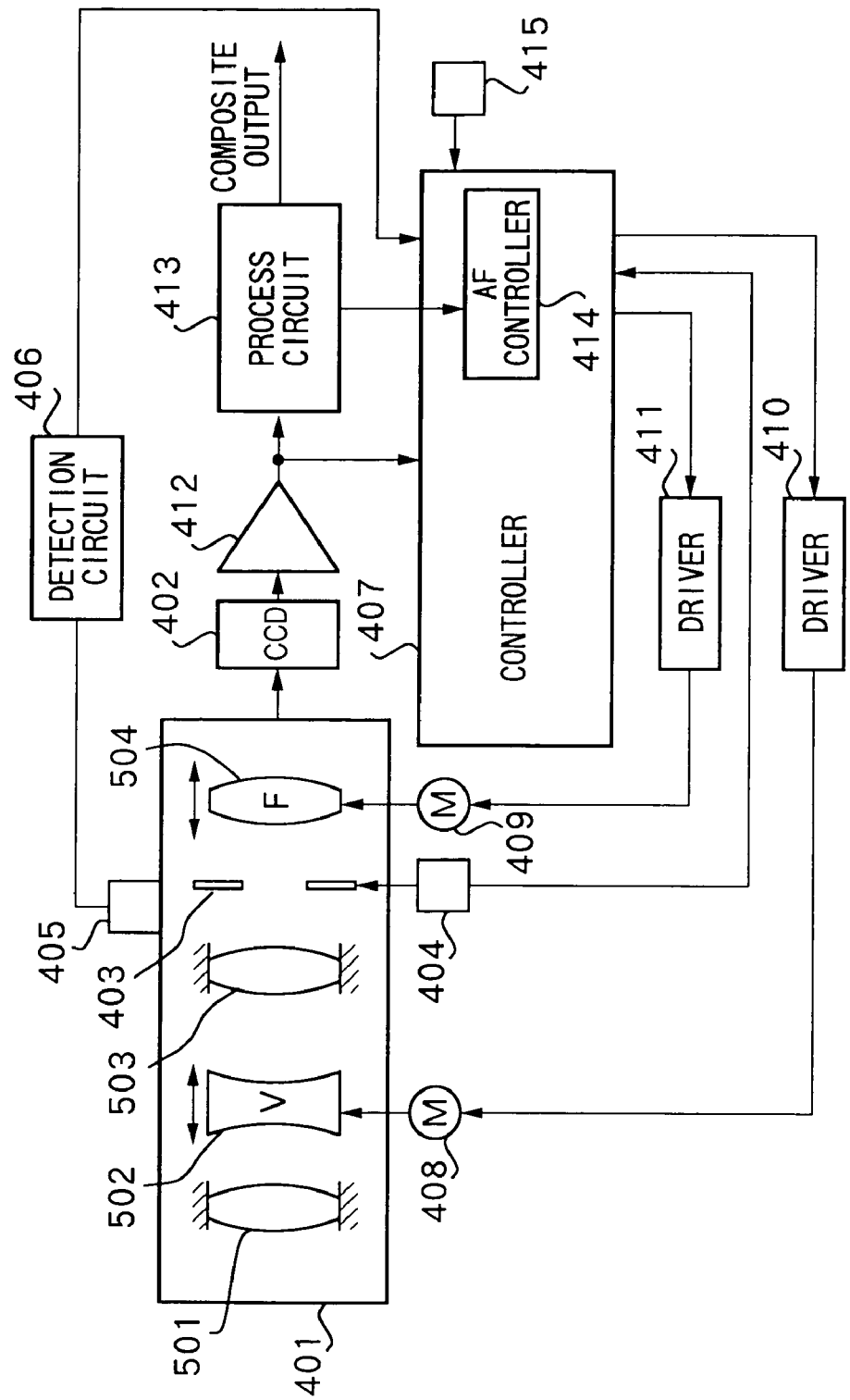
FIG. 20 is a schematic block diagram showing the arrangement of an imaging apparatus according to the eighth embodiment of the present invention.

FIG. 20 is a schematic block diagram showing the arrangement of an imaging apparatus according to the eighth embodiment of the present invention. Referring to FIG. 20, reference numeral 401 denotes an optical system which is constructed by a 4-group rear-focus zoom lens (to be abbreviated as an "RFZ lens" hereinafter) including four lens groups. More specifically, the RFZ lens 401 is constructed by a first lens group (to be referred to as a front lens hereinafter) 501 as a stationary lens group, a second lens group (to be referred to as a variator hereinafter) 502 as a movable lens group having a zooming function, a third lens group (to be referred to as an afocal hereinafter) 503 as a stationary lens group, and a fourth lens group (to be referred to as a focus compensation lens hereinafter) 504 which is a movable lens group, and has a focusing function, and a compensator function of correcting variations of the image plane upon zooming.

Reference numeral 402 denotes a photoelectric conversion element such as a CCD; 403, a stop for adjusting the amount of light that becomes incident on the photoelectric conversion element 402; 404, a stop driver for changing the aperture area of the stop 403; 405, a stop position detector for detecting the position of the stop 403; 406, a detection circuit for detecting the aperture area (stop amount) of the stop 403 on the basis of the output signal from the stop position detector 405; and 407, a controller for systematically controlling imaging by the imaging apparatus of this embodiment.

Note that the controller 407 comprises a microcomputer, and has a CPU, ROM, and RAM (not shown). The ROM stores cam loci shown in FIG. 21, and control programs and the like corresponding to the flow charts shown in FIGS. 23 and 26. The CPU controls various kinds of processing such as AF processing in accordance with the control programs stored in the ROM while using the RAM as a work area.

Reference numerals 408 and 409 denote motors such as stepping motors for respectively moving the variator 502 and focus compensation lens 504. These motors 408 and 409 are respectively driven by motor drivers 410 and 411. Reference numeral 412 denotes an amplifier for amplifying the output signal from the photoelectric conversion element 402; and 413, a process circuit for converting the amplified signal into a video signal such as an NTSC video signal or the like.

Reference numeral 414 denotes an AF controller for generating a signal for auto-focusing (to be abbreviated as AF hereinafter) from the output signal of the process circuit 413, and controlling AF; and 415, a zooming unit. The AF controller 414 uses the high-frequency component, edge shape, and the like of the video signal as in-focus information of an object, and determines the in-focus level based on the in-focus information. As the AF scheme, hill-climbing and the like have been proposed. However, the basic principle of such AF scheme is known to those who are skilled in the art by, e.g., Japanese Patent Laid-Open No. 62-103616, and the like, and a detailed description thereof will be omitted. The zooming unit 315 outputs a signal indicating the zooming direction (TELE or WIDE) and zooming speed. The zooming speed may be either a plurality of arbitrary speeds or a fixed speed.

Figure 21:
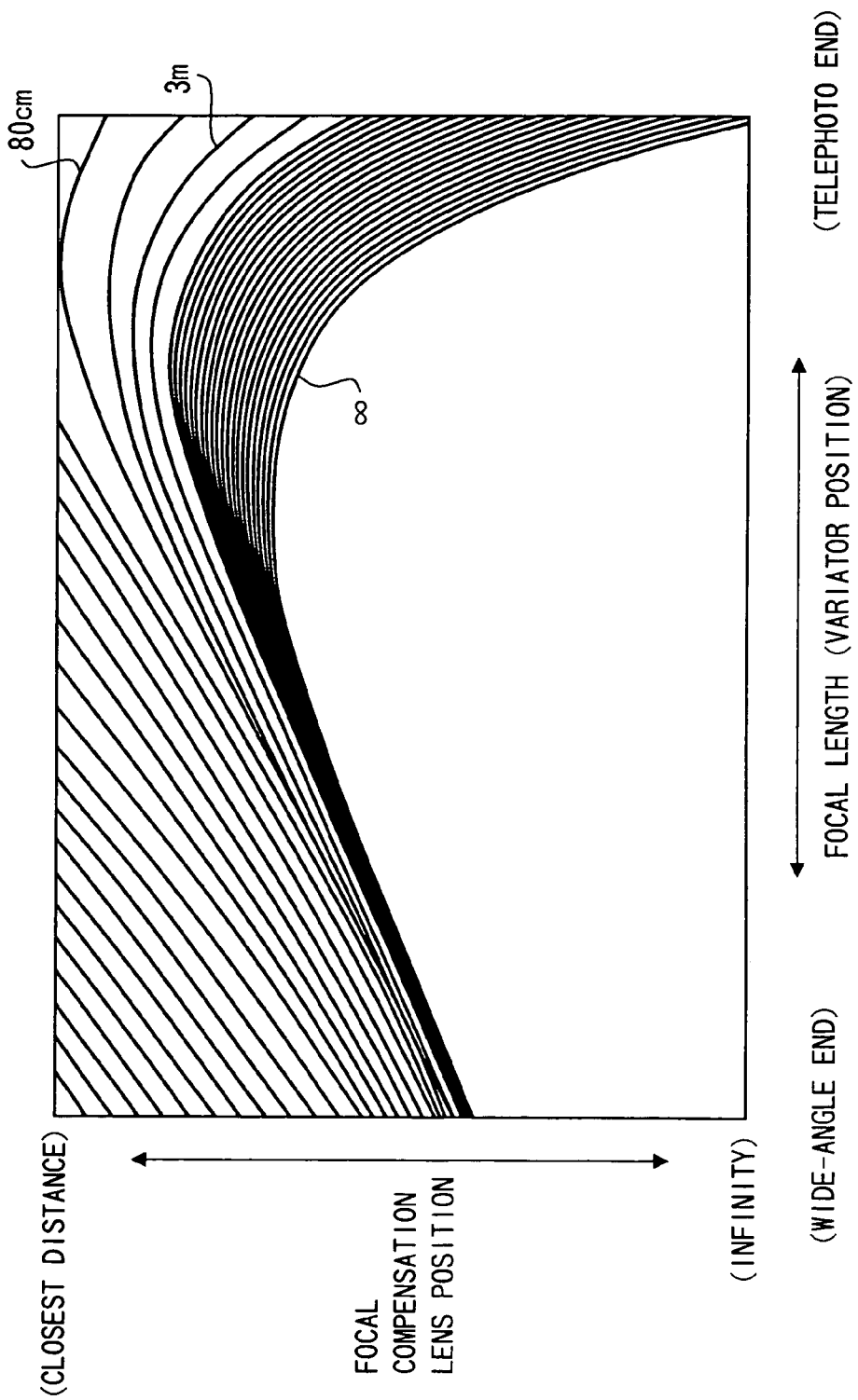
FIG. 21 is a graph showing cam loci.

FIG. 21 shows cam loci that represent the positional relationship between the variator 502 that changes the field angle and the focus compensation lens 504 that performs focus adjustment on the optical axis in the in-focus state. Upon zooming, the controller 407 drives the variator 502 and focus compensation lens 504 to trace one of these cam loci, thus preventing blurring. However, since blur may be produced by movement of the object or initial selection errors of the cam locus, the AF controller 414 operates to detect any blur.

In this case, the AF controller 414 samples a video signal generated by the process circuit 413 at the vertical scanning frequency of that video signal, and determines the in-focus level on the basis of the high-frequency component and the like in the sampled video signal. The AF controller 414 compares the in-focus level obtained by the previous sampling with that obtained at a sampling period (to be described later) to find a cam locus with higher in-focus level, and directs the controller 407 to switch the current cam locus to that with higher in-focus level.

The cam locus is selected without comparing the current and previous in-focus levels for the following reason.

Figure 22:
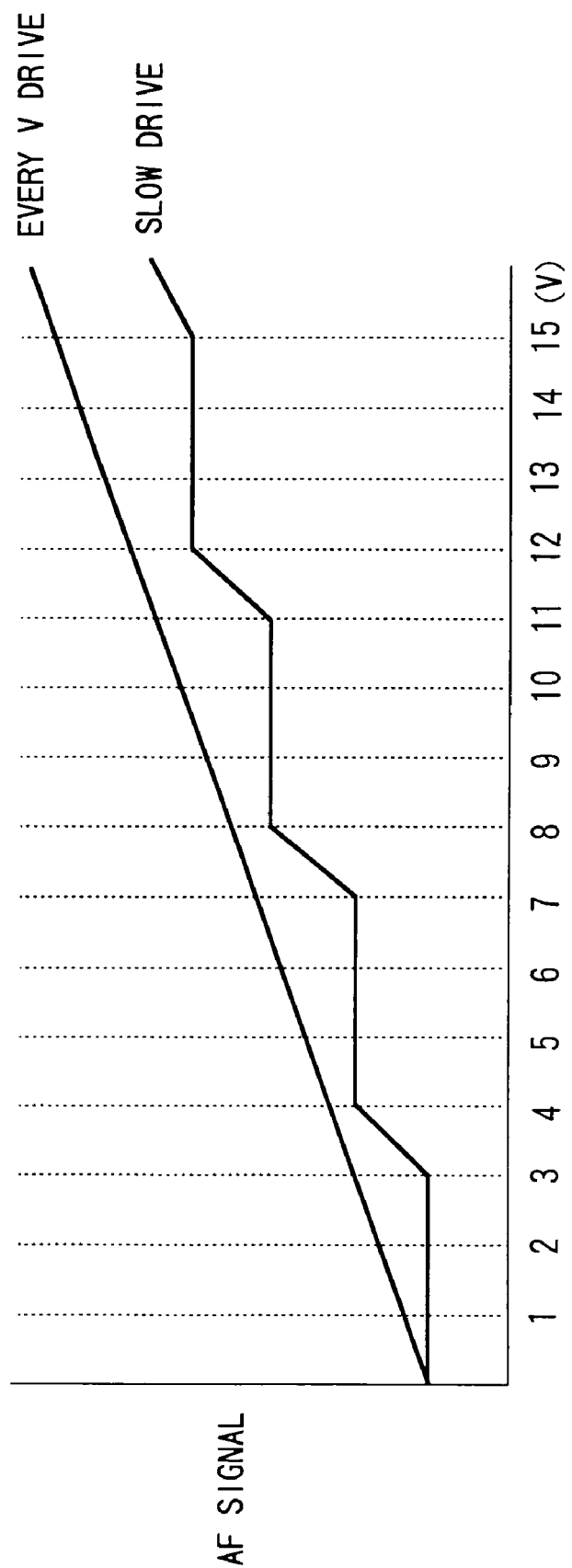
FIG. 22 is a graph showing examples of changes in AF signal upon driving a variator at the sampling periods of the AF signal and at intermittent periods.

More specifically, when the current and previous in-focus levels are compared, in case of ultra-low-speed zooming, the in-focus level obtained by the current sampling may remain the same as that obtained by the previous sampling in relation to the sampling period of an AF signal and the zooming speed. This example will be explained with reference to FIG. 22. FIG. 22 shows the relationship between the drive period of the variator 502 and AF signal when a stepping motor is used as a drive motor for the variator 502, and the abscissa plots a sampling period (V) of the AF signal.

If the zooming speed is expressed by, e.g., PPS (PPS: drive pulses of stepping motor÷speed), when the variator 502 is driven at the sampling period of the AF signal, all AF signals can be reliably sampled when the variator 502 is driven (see "every V drive" in FIG. 22). However, when the AF signal (video signal) is sampled in synchronism with, e.g., the vertical scanning frequency (assume 60 Hz for NTSC) of a video signal generated by the process circuit 413, the variator 502 is intermittently driven for sampling at a zooming speed less than 60 PPS. A curve indicated by "slow drive" in FIG. 22 indicates an AF signal when the zooming speed is 15 PPS. In this case, the variator 502 is driven once every time the AF signal is sampled four times, and the AF signal changes.

Figure 2:
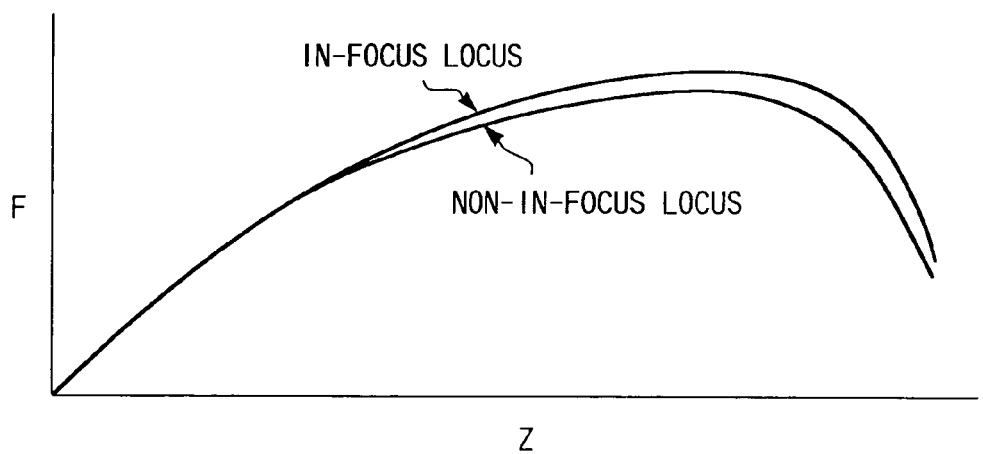
FIG. 2 is a graph for explaining necessity for changing the cam loci.
Figure 3:
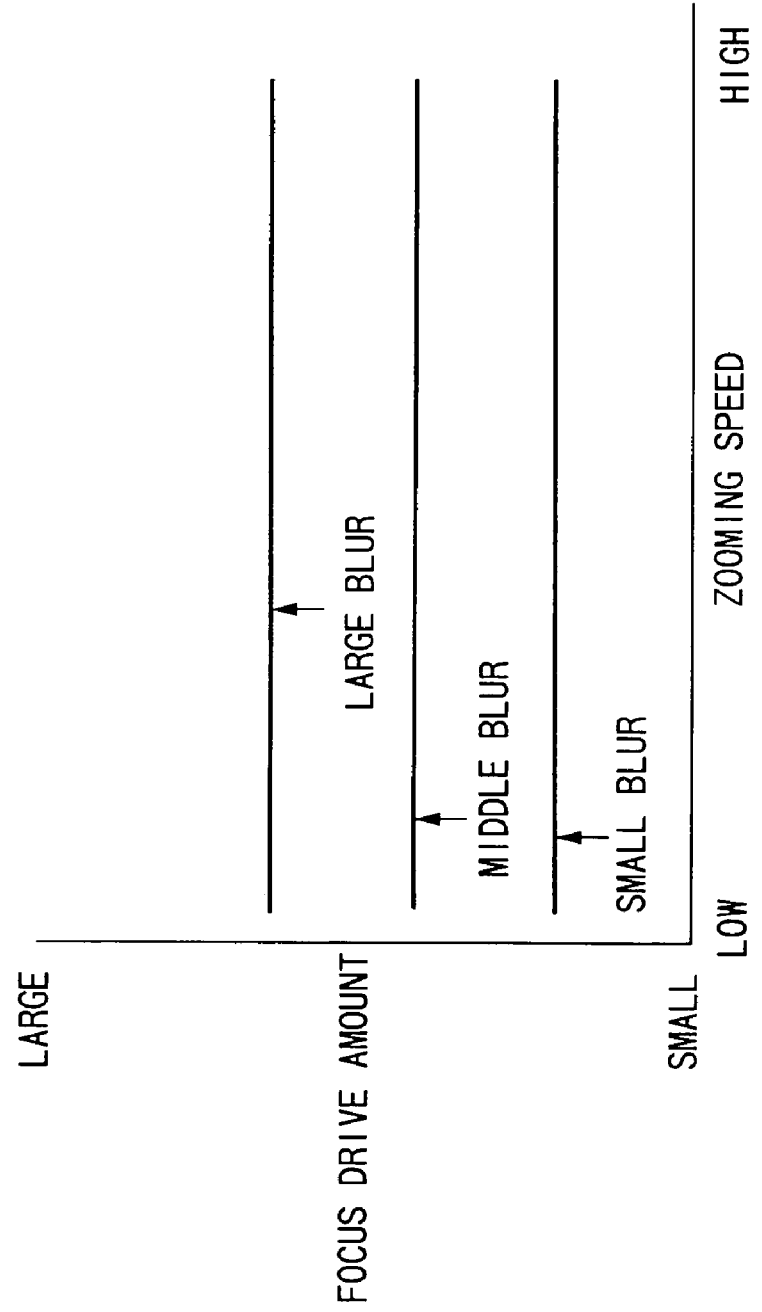
FIG. 3 is a graph showing an example of conventional changing processing of cam loci on the basis of blur recognition during zooming.

In this case, since the variator 502 halts at three out of four sampling timings, the in-focus levels obtained at the previous and current sampling timings remain constant. For this reason, even when blurring has occurred by tracing a nonin-focus locus shown in FIG. 2, switching to an in-focus locus cannot be made in time, or the control may halt in the blur state.

In order to solve such problem, the AF controller 414 determines the AF signal to be compared from those obtained in previous "V"s by a calculation on the basis of the zooming speed and the sampling period of the AF signal.

Figure 23:
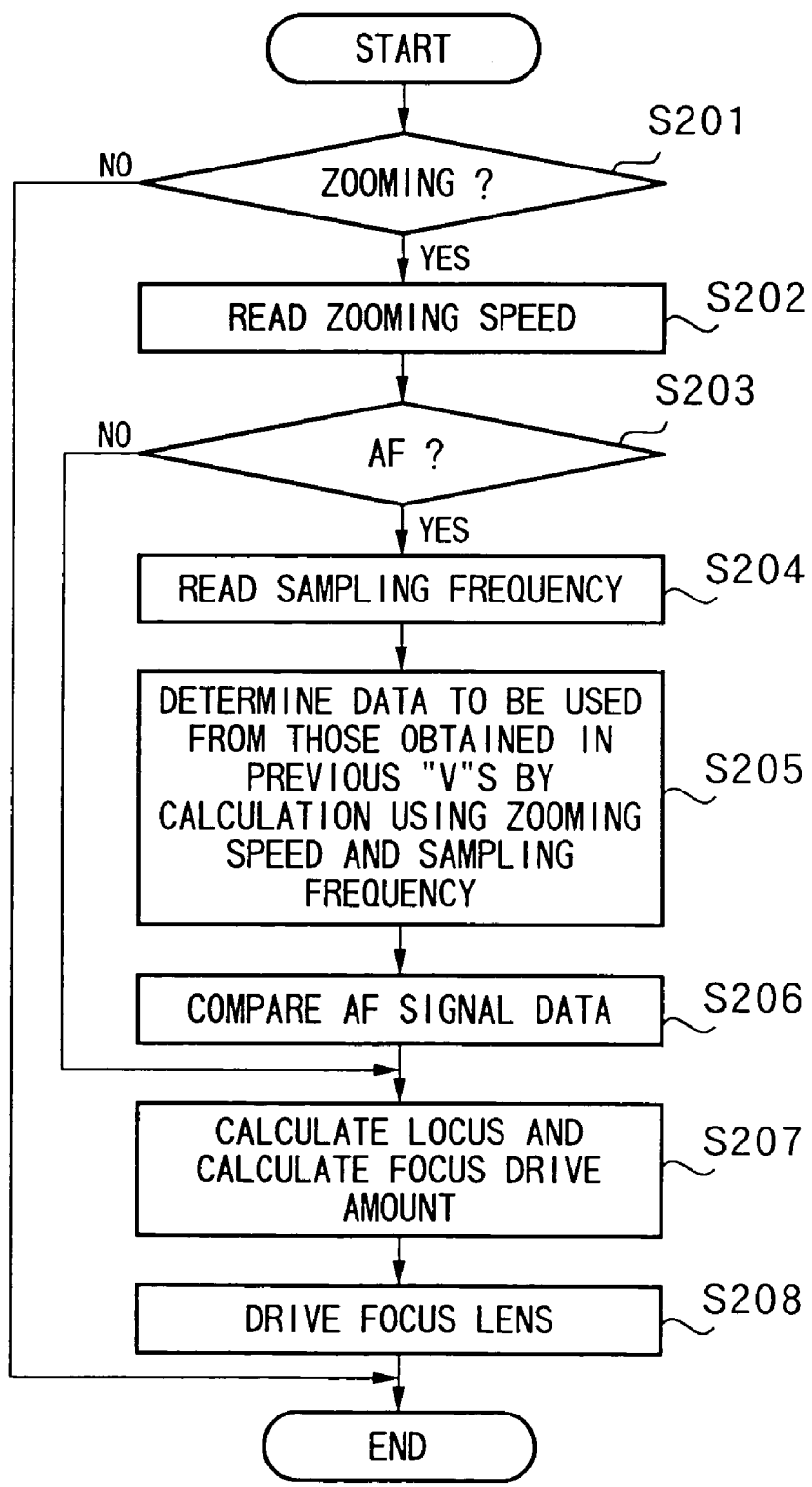
FIG. 23 is a flow chart showing cam locus tracing during zooming in the eighth embodiment.

Cam locus trace during zooming will be explained below with reference to the flow chart in FIG. 23. Note that the processing in FIG. 23 repeats itself during zooming.

It is checked based on a zoom drive command from the zooming unit 415 if the zooming mode is selected (step S201). If NO in step S201, the control ends. On the other hand, if YES in step S201, the zooming speed signal from the zooming unit 415 is read (step S202). It is checked if the AF mode is set by an AF switch (not shown) (step S203). As a result, if NO in step S203, the cam locus is calculated on the basis of the zooming speed directed by the zooming unit 415 and the current positions of the variator 502 and focus compensation lens 504, and a focus drive amount corresponding to the calculated cam locus is calculated (step S207). The cam locus calculation is done since only representative cam loci are stored, as shown in FIG. 21, and an intermediate cam locus is obtained by a calculation to focus the lens with high precision using only a small volume of information.

On the other hand, if the AF mode is set, the sampling frequency of the AF signal is read (step S204), and an AF signal to be used is determined from those obtained in previous "V"s (step S205) by:

$$PV=SV+ZMSP \qquad (3)$$

where PV is the number of Vs to go back, SV is the sampling frequency of the AF signal, and ZMSP is the zooming speed. Note that PV is rounded up if the quotient has a remainder. Between the sampling period PV back obtained by equation (3), and the current sampling period, the variator 502 must have been driven. Also, the sampling period PV back is the one having a minimum interval from the current sampling period of those at which the variator 502 was driven.

Subsequently, the AF signal PV back calculated by equation (3) is compared with the current AF signal (step S206). A cam locus with higher in-focus level is selected, and a focus drive amount for tracing the selected cam locus is calculated on the basis of the zooming speed and the position of the variator 502 (step S207). The focus compensation lens 504 is driven by the calculated focus drive amount (step S208), thus ending the processing.

As described above, since the AF signal to be compared with the current AF signal is the one PV back calculated by equation (3), i.e., in the sampling period (V) in which the variator 502 was certainly driven, recognition errors of blur due to absence of AF signal changes can be prevented, and blur can be reliably detected to quickly change the cam locus.

Ninth Embodiment

Figure 24:
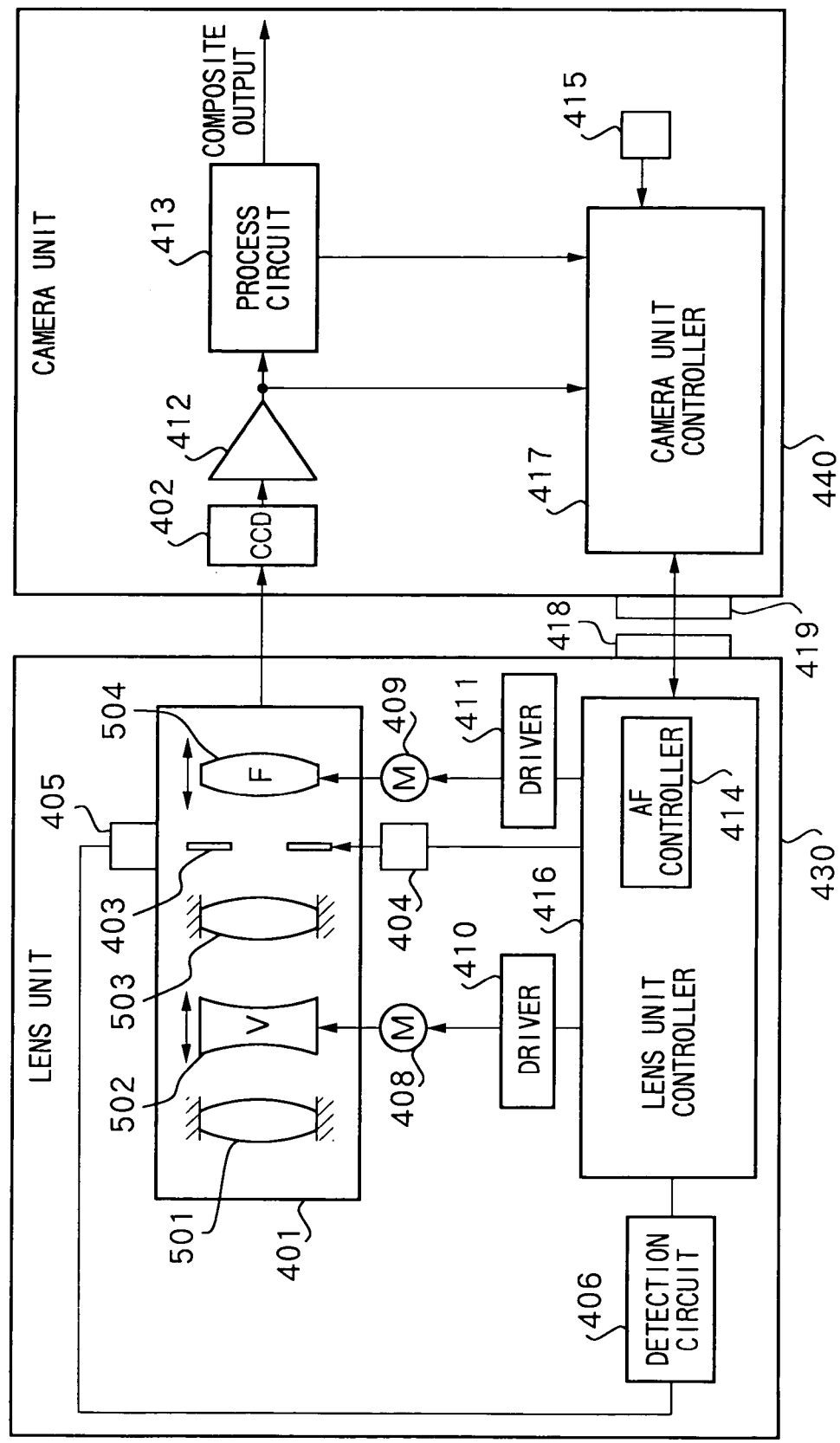
FIG. 24 is a schematic block diagram showing the arrangement of an imaging apparatus according to the ninth embodiment of the present invention.

FIG. 24 is a schematic block diagram showing the arrangement of an imaging apparatus according to the ninth embodiment of the present invention.

The imaging apparatus according to the ninth embodiment is of exchangeable lens type, and a camera unit controller 417 in a camera unit 440 transmits an AF control signal in a video signal generated by a process circuit 413, a stop control signal, an operation signal from a zooming unit 415, and the like to a lens unit controller 416 in a lens unit 430 via a camera contact 419 and lens contact 418. The lens unit controller 416 controls AF and the stop on the basis of the signals transmitted from the camera unit controller 417, and transmits the zoom position, focus position, stop position, and the like to the camera unit controller 417.

An AF controller 414 in the lens unit controller 416 determines an AF signal to be compared with the current AF signal using equation (3) as in the AF controller 414 of the eighth embodiment. Hence, the same effect as in the eighth embodiment can be obtained. When the AF controller 414 is mounted on the camera unit 440, the cost of the lens unit 430 can be reduced.

10th Embodiment

Figure 25:
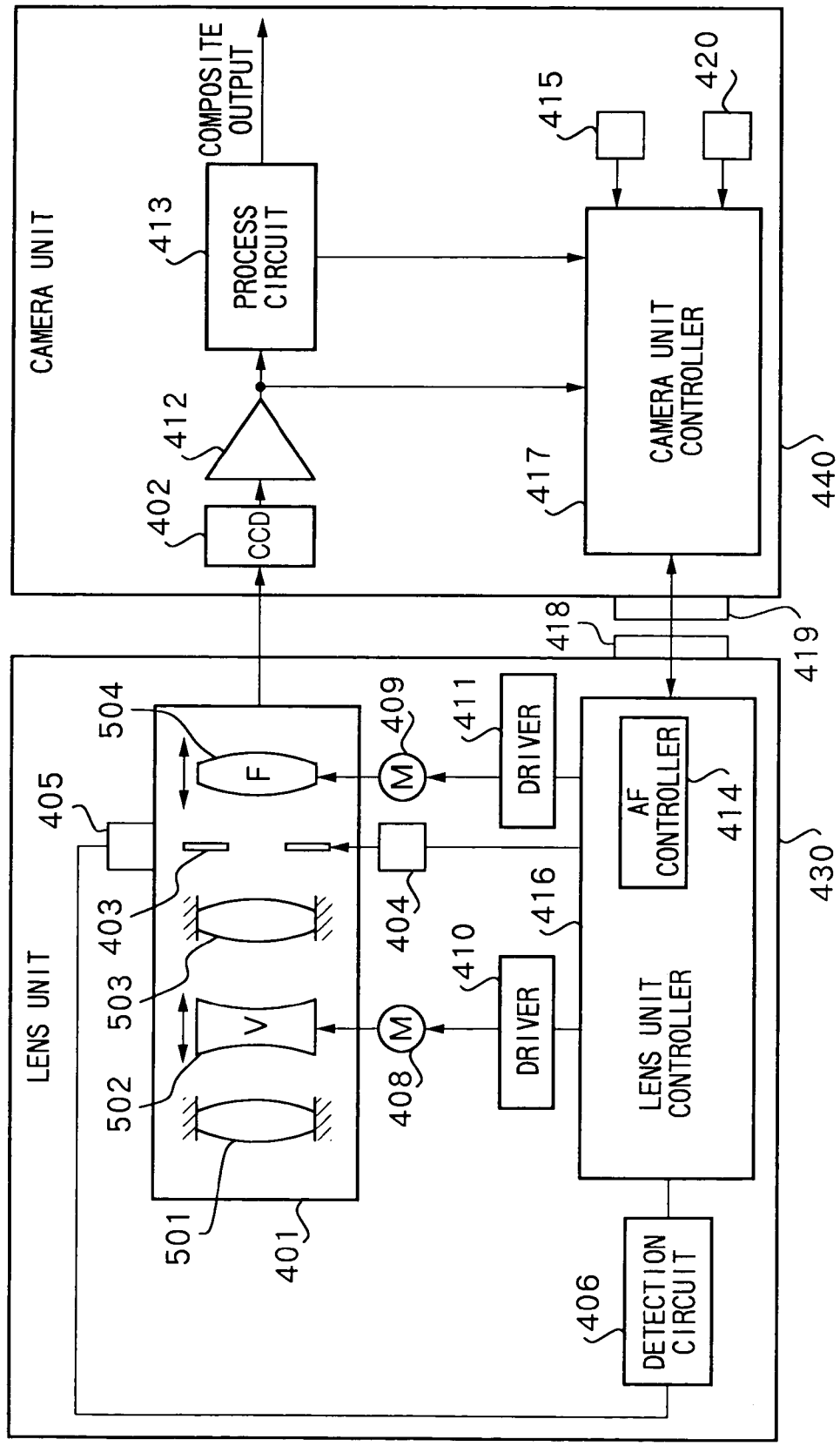
FIG. 25 is a schematic block diagram showing the arrangement of an imaging apparatus according to the 10th embodiment of the present invention.

FIG. 25 is a schematic block diagram showing the arrangement of an imaging apparatus according to the 10th embodiment of the present invention. The imaging apparatus of the 10th embodiment is also of exchangeable lens type as in the ninth embodiment, and has substantially the same arrangement and functions as those of the ninth embodiment.

However, in the 10th embodiment, a format memory 420 for storing television formats such as NTSC, PAL, and the like is added to the camera unit 440. The television format stored in the format memory 420 is transmitted to the AF controller 414 in the lens unit 430 via the camera contact 419 and lens contact 418. The Af controller 414 detects the vertical scanning frequency on the basis of the received television format, and samples an AF signal at the detected vertical scanning frequency. Also, the AF controller 414 determines the AF signal to be compared with the current AF signal from those obtained in previous "V"s by a calculation using the detected vertical scanning frequency.

Figure 26:
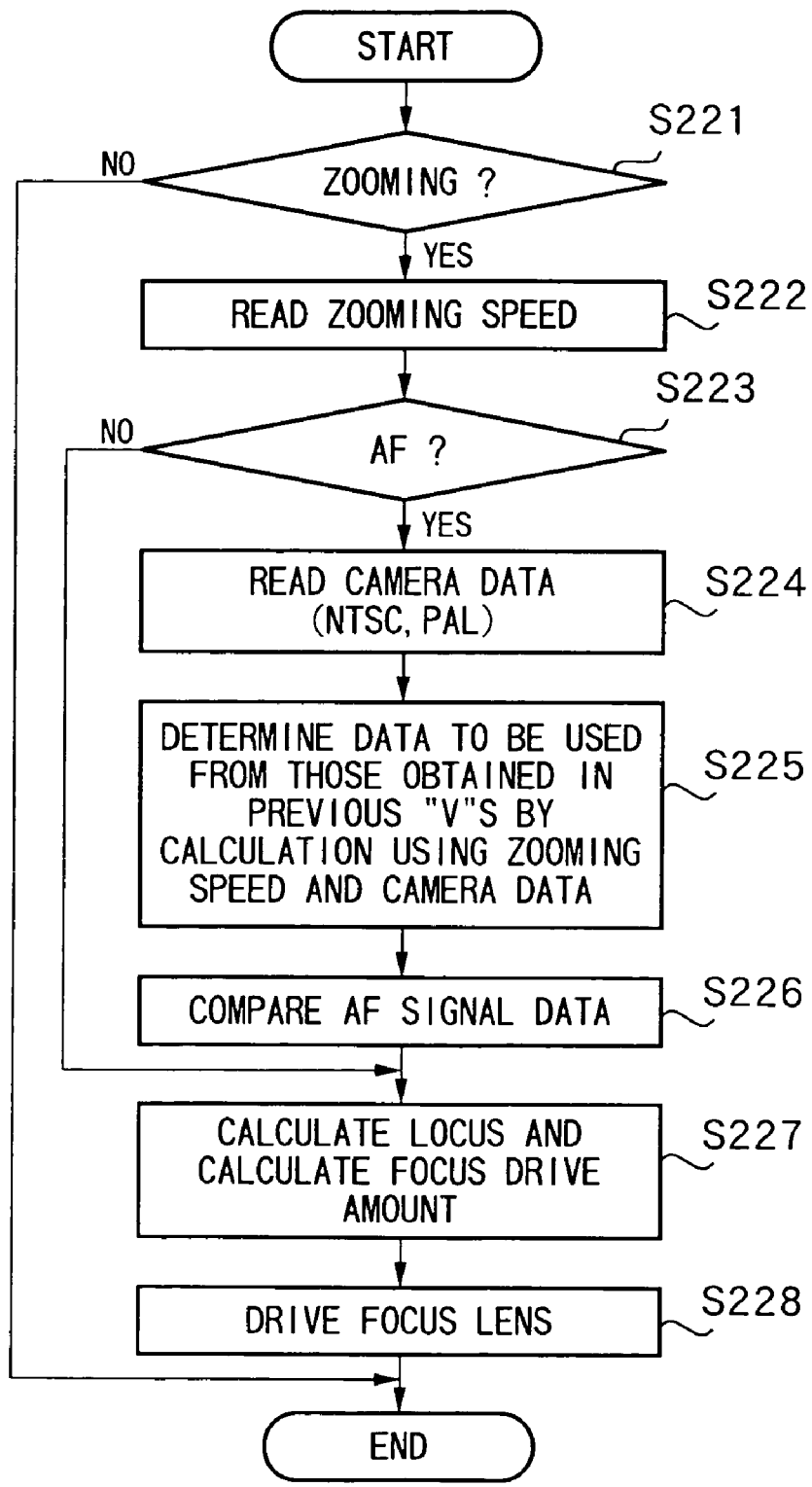
FIG. 26 is a flow chart showing cam locus tracing during zooming in the 10th embodiment of the present invention.

Cam locus trace during zooming according to the 10th embodiment will be explained below with reference to the flow chart in FIG. 26. Note that the processing in FIG. 26 repeats itself during zooming.

It is checked based on a zoom drive command from the zooming unit 415 if the zooming mode is selected (step S221). If NO in step S221, the control ends. On the other hand, if YES in step S221, the zooming speed signal from the zooming unit 415 is read (step S222). It is checked if the AF mode is set by an AF switch (not shown) (step S223). As a result, if NO in step S223, the cam locus is calculated on the basis of the zooming speed directed by the zooming unit 415 and the current positions of the variator 502 and focus compensation lens 504, and a focus drive amount corresponding to the calculated cam locus is calculated (step S227). The cam locus calculation is done since only representative cam loci are stored, as shown in FIG. 21, and an intermediate cam locus is obtained by a calculation to focus the lens with high precision using only a small volume of information.

On the other hand, if the AF mode is set, camera data (television format) is read from the camera unit 440 via a communication to detect its vertical scanning frequency, and the AF signal is sampled in synchronism with the detected vertical scanning frequency (step S224). Then, an AF signal to be used is determined from those obtained in previous "V"s (step S225). When the television format is NTSC, equation (4) below is used; if it is PAL, equation (5) below is used.

$$PV=NV+ZMSP \qquad (4)$$

where NV is the vertical scanning frequency of the NTSC television format $$PV = PaV + ZMSP \quad (5)$$

where PaV is the vertical scanning frequency of the PAL television format.

Note that PV is rounded up if the quotient has a remainder. Between the sampling period PV back obtained by equation (4) or (5), and the current sampling period, the variator 502 must have been driven. Also, the sampling period PV back is the one having a minimum interval from the current sampling period of those in which the variator 502 was driven.

Subsequently, the AF signal PV back calculated by equation (4) or (5) is compared with the current AF signal (step S226). A cam locus with higher in-focus level is selected, and a focus drive amount for tracing the selected cam locus is calculated on the basis of the zooming speed and the position of the variator 502 (step S227). The focus compensation lens 504 is driven by the calculated focus drive amount (step S228), thus ending the processing.

In this manner, since the frequency to be used as the sampling frequency of the AF signal is detected on the basis of television format information transmitted from the camera unit 440, the lens unit 430 as an exchangeable lens can be used together with camera units 440 of different television formats, thus improving compatibility.

Note that the present invention is not limited to the eighth to 10th embodiments. For example, in place of the television format, the vertical scanning frequency itself of that television format may be transmitted. Also, in place of selecting a cam locus by comparing the in-focus level several periods before with the current in-focus level, if the zooming speed is low, the sampling frequency itself may be decreased to prolong the sampling period, and a cam locus may be selected by always comparing the current and previous in-focus levels. Furthermore, these embodiments can be applied to a case wherein the variator and focus compensation lens are driven by motors which rotate continuously.

To restate, according to the eighth to 10th embodiments, in an imaging apparatus which comprises a lens system including a zoom lens group for changing the field angle and a focus compensation lens group having both a function of correcting changes in focal plane position upon movement of the zoom lens group and a focus adjustment function, and storage means for storing a locus representing the positional relationship between the zoom lens group and focus compensation lens group in an in-focus state in correspondence with the object distance, and moves the zoom lens group and focus compensation lens group to trace the stored locus upon zooming, a video signal is generated by photoelectrically converting an optical image obtained from the lens system, the focus states are detected upon zooming from the generated video signal at a predetermined period and are compared to determine the in-focus level and a direction to drive to reach an in-focus point, and the period is determined on the basis of the moving speed of the zoom lens group.

Hence, recognition errors of deterioration of the in-focus level due to absence of in-focus level changes, although blurring has occurred in practice, can be prevented irrespective of the zooming speed, and deterioration of the in-focus level can be reliably detected to quickly change the cam locus.

11th Embodiment

Figure 27:
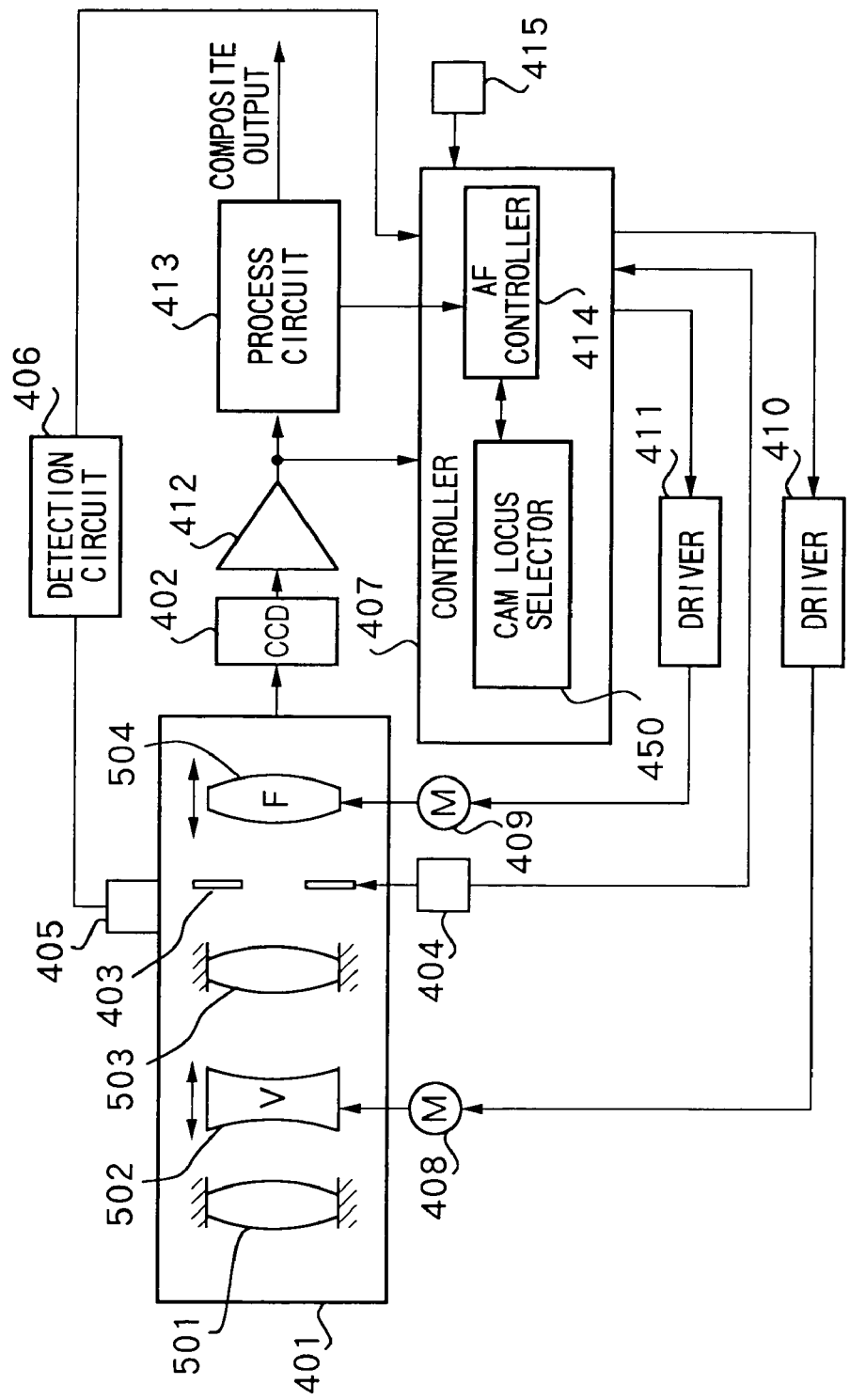
FIG. 27 is a schematic block diagram showing the arrangement of an imaging apparatus according to the 11th embodiment of the present invention.

FIG. 27 shows the 11th embodiment of the present invention. In this embodiment, a cam locus selector 450 is added to the imaging apparatus of the eighth embodiment shown in FIG. 20.

Referring to FIG. 27, reference numeral 450 denotes a cam locus selector for selecting an optimal cam locus that can remove blur produced during zooming. The cam locus selector 450 selects a cam locus on the basis of the zooming speed, and the blur detection level (in-focus level) informed from the AF controller 414. Note that the cam locus is selected by determining the drive amount (to be referred to as a focus drive amount hereinafter) of the focus compensation lens 504 in practice.

Figure 28:
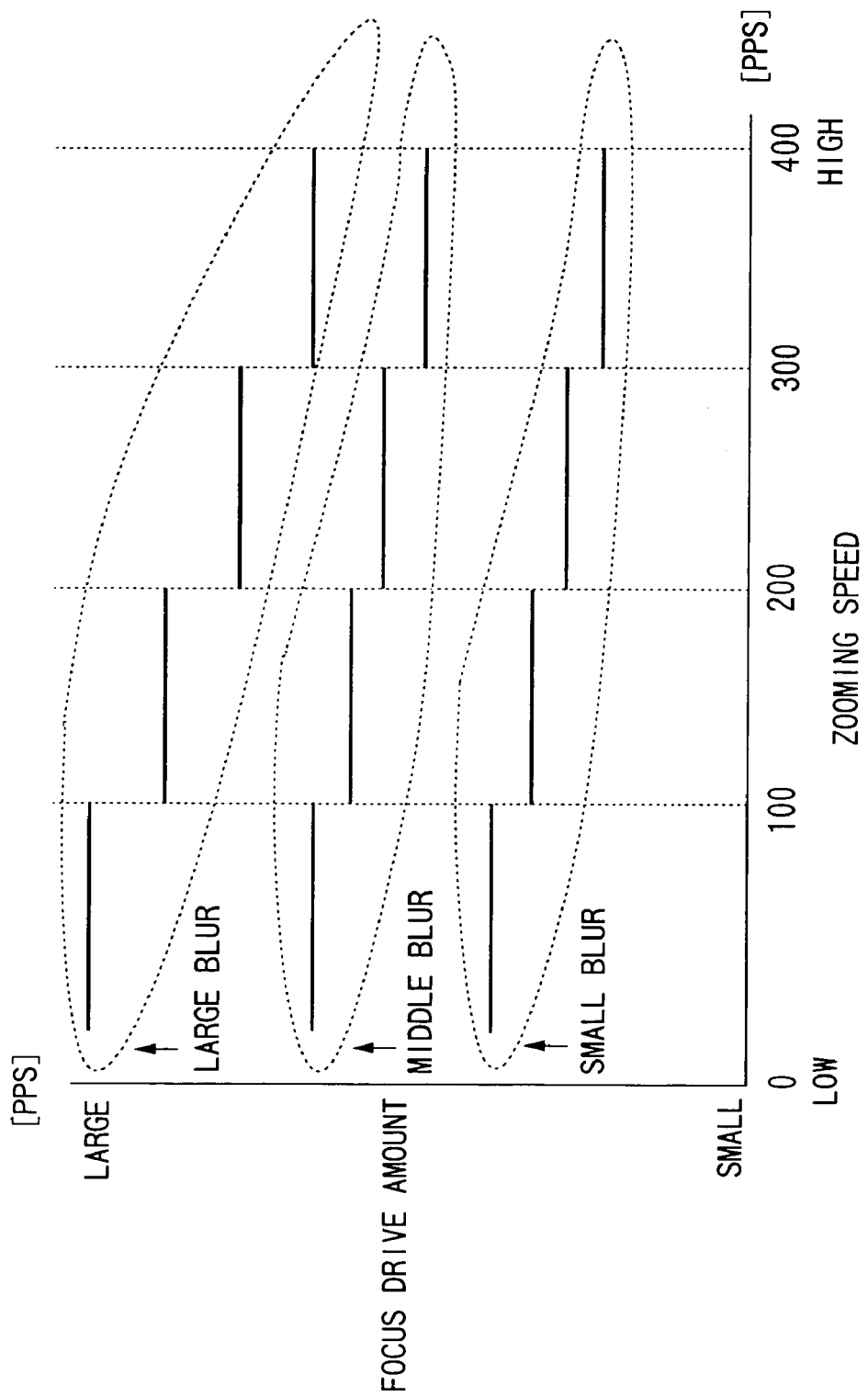
FIG. 28 is a graph showing examples of stepwise changes in focus moving amount used for changing the cam loci in correspondence with the blur level and zooming speed.

Upon selecting a cam locus on the basis of the zooming speed and blur detection level, the cam locus selector 450 sets a large focus drive amount when the zooming speed is low and blur is large, as shown in FIG. 28. On the other hand, the selector 450 sets a small focus drive amount when the zooming speed is high and blur is small. That is, the focus drive amount is determined in inverse proportion to the in-focus level and zooming speed.

In this embodiment, in practice, an optimal cam locus that can remove blur, i.e., the focus drive amount is given by:

$$AFP = AFD \times FK \quad (6)$$

where AFP is the focus drive amount based on the blur detection level, FK is a calculation coefficient obtained from the zooming speed and blur detection level, and AFD is the unit focus drive amount upon detection of blur.

The unit focus drive amount AFD takes the focal length, stop, focus position, and the like into consideration, and is obtained by calculation in correspondence with the focal length, stop, focus position, and the like. That is, the amount AFD varies if the focal length, stop, focus position, and the like vary. In this case, the focus drive amount corresponding to the focal length, stop, focus position, and the like may be stored in the form of a table, and may be read out as needed.

Figure 29:
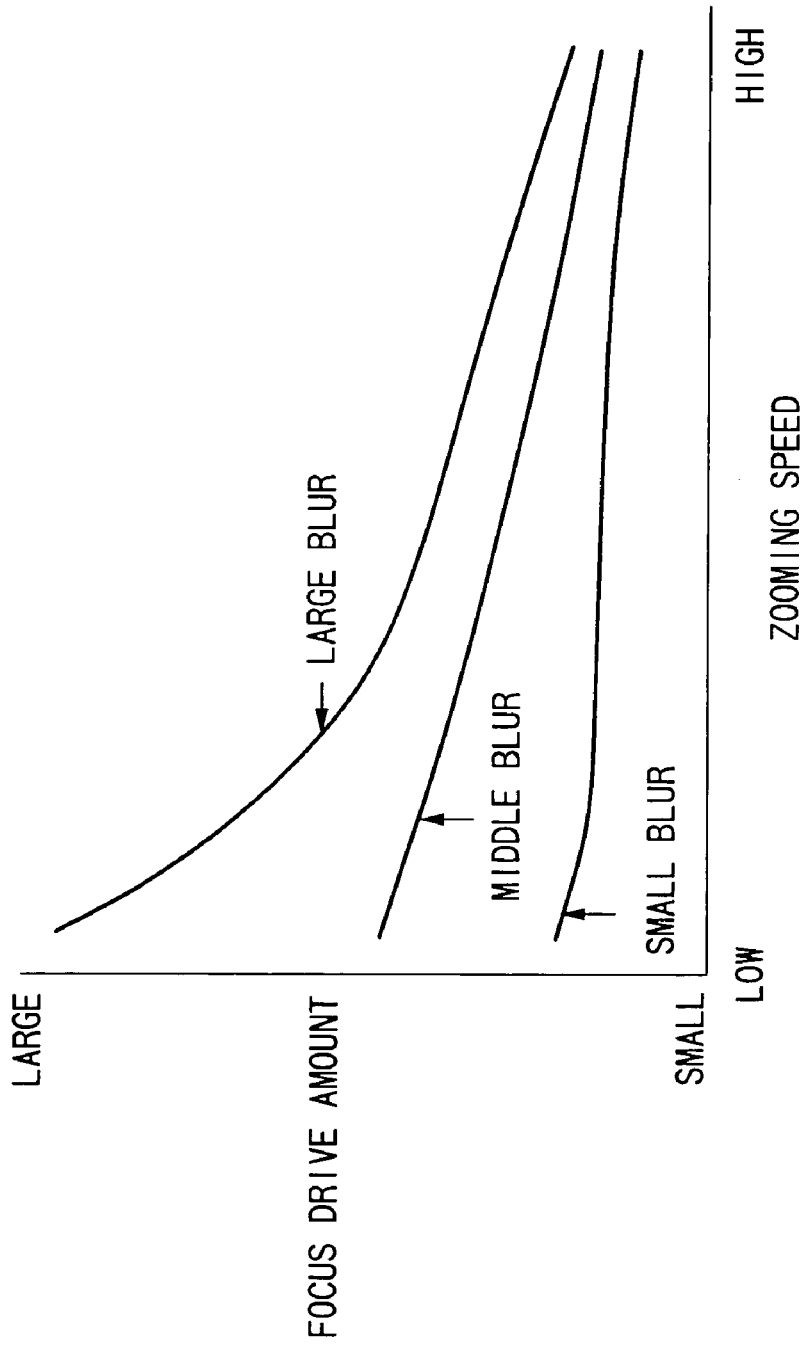
FIG. 29 is a graph showing examples of continuous changes in focus moving amount used for changing the cam loci in correspondence with the blur level and zooming speed.

The calculation coefficient FK limits the focus drive amount to be proportional to blur (i.e., inverse proportional to in-focus level) and to be inversely proportional to the zooming speed, as shown in FIG. 29. The calculation coefficient FK may be obtained using a predetermined formula on the basis of the zooming speed and blur detection level, or the moving distance of the focus compensation lens group 504 corresponding to the blur detection level and zooming speed may be stored in the form of table and a calculation coefficient corresponding to the zooming speed and blur detection level may be read out as needed. The calculation coefficient FK is preferably stored in a rewritable storage medium since it can be arbitrarily changed.

The calculation coefficient FK may change the focus drive amount stepwise, as shown in FIG. 28, or continuously, as shown in FIG. 29. Furthermore, when a calculation coefficient FK that changes stepwise is used, the change step of the focus drive amount may be smaller than that in FIG. 28.

Figure 30:
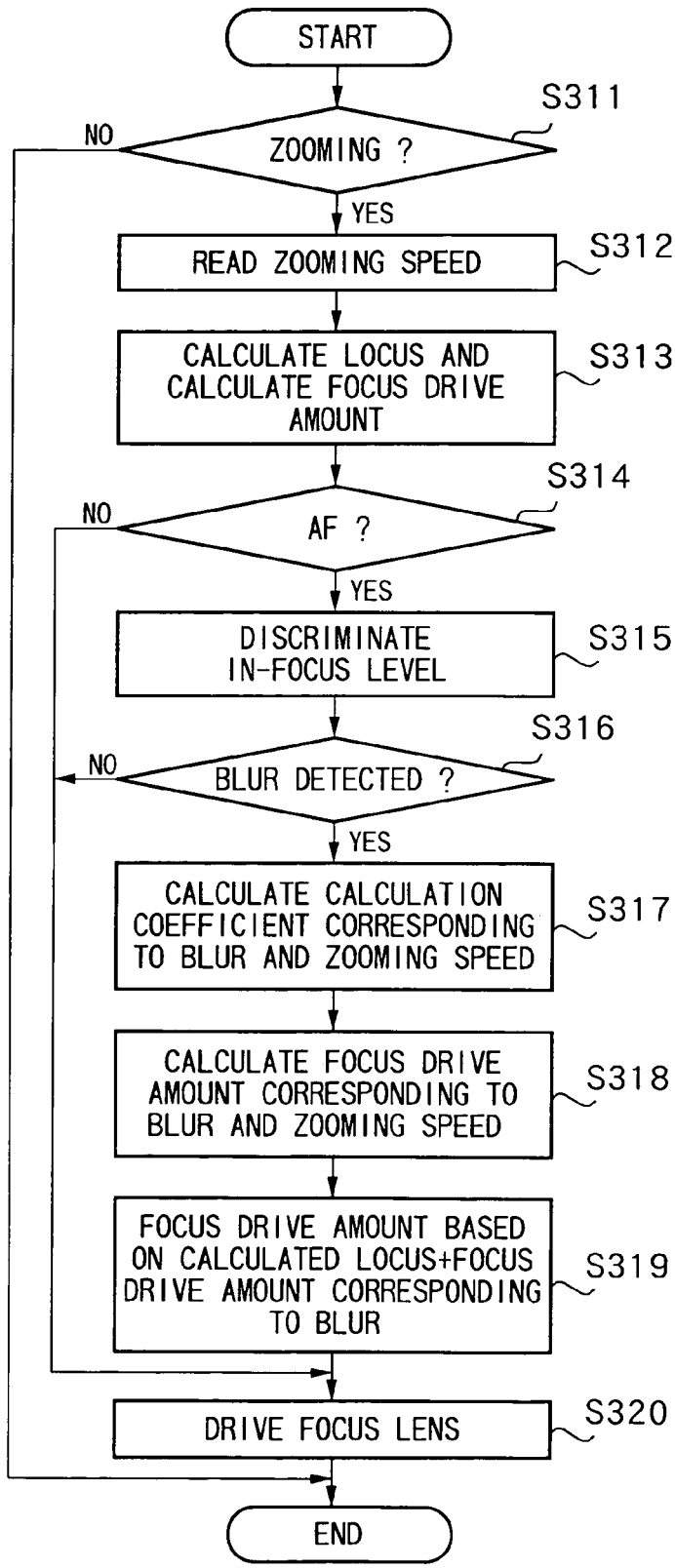
FIG. 30 is a flow chart showing focusing during zooming.

Focusing during zooming will be explained below with reference to the flow chart in FIG. 30. Note that the processing in FIG. 30 repeats itself during zooming.

It is checked based on a zoom drive command from the zooming unit 415 if the zooming mode is selected (step S311). If NO in step S311, the control ends. On the other hand, if YES in step S311, the zooming speed signal from the zooming unit 415 is read (step S312). The cam locus is calculated on the basis of the zooming speed and the current positions of the variator 502 and focus compensation lens 504, and a focus drive amount corresponding to the calculated cam locus is calculated (step S313). The cam locus calculation is done since only representative cam loci are stored, as shown in FIG. 21, and an intermediate cam locus is obtained by a calculation to focus the lens with high precision using only a small volume of information.

It is checked if the AF mode is set by an AF switch (not shown) (step S314). As a result, if NO in step S314, the focus compensation lens 504 is driven by the focus drive amount calculated in step S313 (step S320), thus ending the processing. On the other hand, if the AF mode is set, the AF controller 414 executes in-focus level determination to detect any blur (step S315), and it is then checked if blur is detected (step S316). As a result, if no blur is detected, the focus compensation lens 504 is driven by the focus drive amount calculated in step S313 (step S320), thus ending the processing.

On the other hand, if blur is detected, the calculation coefficient FK corresponding to the blur level (in-focus level) and zooming speed is calculated (step S317). A focus drive amount corresponding to the blur level (in-focus level) and zooming speed is calculated by equation (6) above using the calculated calculation coefficient FK (step S318). Then, the focus drive amount corresponding to the cam locus calculated in step S313, and that corresponding to the blur level (in-focus level) and zooming speed calculated in step S318 are added to each other (step S319). The focus compensation lens 504 is then driven by the sum focus drive amount calculated in step S313 (step S320), thus ending the processing.

In this manner, when the focus compensation lens 504 is driven by the sum focus drive amount, the cam locus can be switched from that selected in step S313 to a cam locus at a position separated by the focus drive amount calculated in step S318 (note that the locus is not switched, and the initially calculated focus drive amount may be merely corrected in some cases). In this case, when the zooming speed is low and blur is large (i.e., the in-focus level is low), the cam locus is switched to the one at a position separated from the currently selected cam locus; when the zooming speed is high and blur is small (the in-focus level is high), the cam locus is switched to the one at a position near the currently selected cam locus.

Therefore, when the cam locus is switched, the control can be prevented from overshooting an in-focus cam locus to be selected and generating blur upon ultra-high-speed zooming. Also, upon ultra-low-speed zooming, an in-focus cam locus can be quickly reached. That is, the focus moving amount upon blurring during zooming can be quickly corrected with high precision independently of the zooming speed.

12th Embodiment

Figure 31:
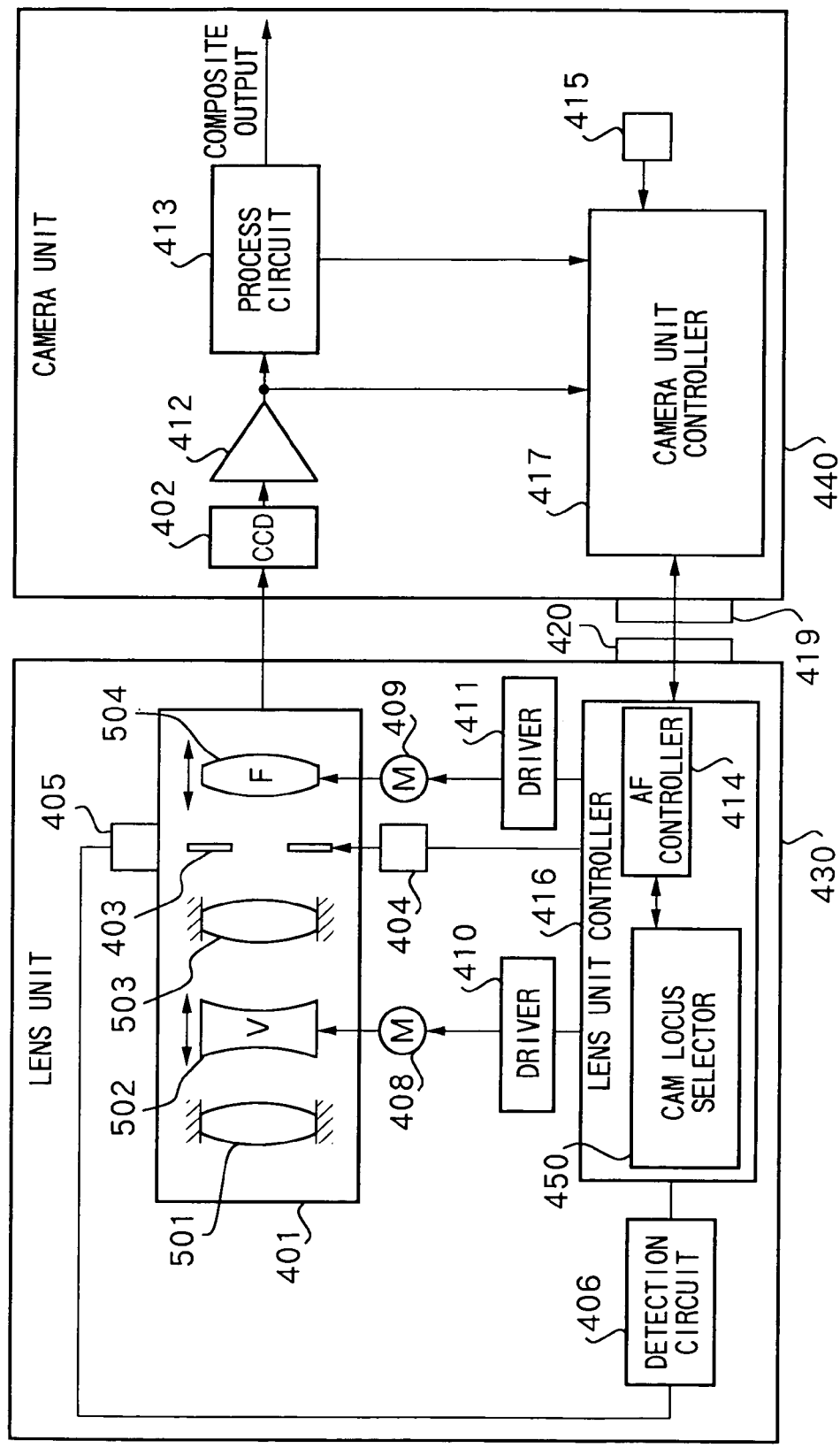
FIG. 31 is a schematic block diagram showing the arrangement of an imaging apparatus according to the 12th embodiment of the present invention.

FIG. 31 is a schematic block diagram showing the arrangement of an imaging apparatus according to the 12th embodiment of the present invention.

The imaging apparatus according to the 12th embodiment is of exchangeable lens type, and a camera unit controller 417 in a camera unit 440 transmits an AF control signal in a video signal generated by a process circuit 413, a stop control signal, an operation signal from a zooming unit 415, and the like to a lens unit controller 416 in a lens unit 430 via a camera contact 419 and lens contact 418. The lens unit controller 416 controls AF and the stop on the basis of the signals transmitted from the camera unit controller 417, and transmits the zoom position, focus position, stop position, and the like to the camera unit controller 417.

The lens unit controller 416 includes an AF controller 414 and cam locus selector 450 as in the controller 407 of the 11th embodiment. When blur is detected during zooming, the cam locus is switched in consideration of the blur level and zooming speed, as in the 11th embodiment. Therefore, the same effect as in the 11th embodiment can be expected. Note that the AF controller 414 and cam locus selector 450 may be mounted on the camera unit 440 to reduce the cost of the lens unit 430.

Note that the present invention is not limited to the 11th and 12th embodiments described above. For example, the focus moving amount may be corrected based on the zooming speed alone.

Also, a locus may be selected based on the position information of the zoom lens and focus lens, the moving amount of the focus lens for tracing the selected locus may be calculated on the basis of the in-focus level, and the calculated moving amount of the focus lens may be changed in correspondence with the moving speed of the zoom lens.

Furthermore, a locus may be selected in correspondence with the position information of the zoom lens and focus lens, in-focus level, and moving speed of the zoom lens and the moving amount of the focus lens for tracing the locus may be controlled. In these cases, a larger focus lens moving amount is set with decreasing in-focus level, and a smaller focus lens moving amount is set with increasing moving speed of the zoom lens.

To recapitulate, according to the 11th and 12th embodiments, an imaging apparatus which comprises a lens system including a zoom lens group for changing the field angle and a focus compensation lens group having both a function of correcting changes in focal plane position upon movement of the zoom lens group and a focus adjustment function, and storage means for storing a locus representing the positional relationship between the zoom lens group and focus compensation lens group in an in-focus state in correspondence with the object distance, and moves the zoom lens group and focus compensation lens group to trace the stored locus upon zooming, comprises selection means for selecting the locus on the basis of positions of the zoom lens group and focus compensation lens group, detection means for detecting the in-focus level, and control means for determining the moving amount of the focus compensation lens on the basis of the selected locus information, the in-focus level detected by the detection means upon zooming, and the moving speed of the zoom lens group. Therefore, the focus moving amount upon production of blur during zooming can be quickly corrected with high precision irrespective of the zooming speed.

The present invention is not limited to the above embodiments and various changes and modifications can be made within the spirit and scope of the present invention. Therefore, to apprise the public of the scope of the present invention the following claims are made.

What is claimed is:

1. An imaging apparatus which has a lens system including a zoom lens group for changing a field angle and a focus compensation lens group having both a function of correcting a change in focal plane position upon movement of said zoom lens group and a focus adjustment function, and storage means for storing a locus that represents a positional relationship between said zoom lens group and focus compensation lens group in an in-focus state in correspondence with an object distance, and moves said zoom lens group and focus compensation lens group to trace the locus stored in said storage means upon zooming, comprising:

generation means for generating a video signal by photoelectrically converting an optical image obtained via said lens system;

focus detecting means for detecting a focus state by extracting a focus value from the video signal generated by said generation means in a predetermined period; and control means for changing the period on the basis of a moving speed of said zoom lens group.

2. The apparatus according to claim 1, wherein said control means divides a period of processing for detecting the focus state by the moving speed of said zoom lens group to obtain a quotient, and determines an in-focus level extracted in an extraction period n extraction periods back (n=the quotient) as an in-focus level to be compared with the currently detected in-focus level.

3. The apparatus according to claim 1, wherein said lens system comprises an exchangeable lens system.

4. The apparatus according to claim 1, wherein said lens system comprises an exchangeable lens system, and said focus detecting means detects a vertical scanning period of the video signal generated by said generation means, which is mounted on an imaging apparatus main body, on the basis of television format information obtained from the imaging apparatus main body via a communication.

5. The apparatus according to claim 1, wherein said lens system comprises an exchangeable lens system, and said focus detecting means obtains a vertical scanning period of the video signal generated by said generation means, which is mounted on an imaging apparatus main body, via a communication.

6. The apparatus according to claim 1, wherein driving of said zoom lens group and focus compensation lens group is controlled by a stepping motor.

7. An imaging method for an imaging apparatus which has a lens system including a zoom lens group for changing a field angle and a focus compensation lens group having both a function of correcting a change in focal plane position upon movement of said zoom lens group and a focus adjustment function, and storage means for storing a locus that represents a positional relationship between said zoom lens group and focus compensation lens group in an in-focus state in correspondence with an object distance, and moves said zoom lens group and focus compensation lens group to trace the locus stored in said storage means upon zooming, comprising:

the generation step of generating a video signal by photoelectrically converting an optical image obtained via said lens system;

the focus detecting step of detecting a focus state by extracting a focus value from the video signal generated in the generation step in a predetermined period; and the control step of changing the period on the basis of a moving speed of said zoom lens group.

8. The method according to claim 7, wherein the control step includes the step of dividing a period of processing for detecting the focus state by the moving speed of said zoom lens group to obtain a quotient, and determining an in-focus level extracted in an extraction period n extraction periods back (n=the quotient) as an in-focus level to be compared with the currently detected in-focus level.

9. The method according to claim 7, wherein said lens system comprises an exchangeable lens system.

10. The method according to claim 7, wherein said lens system comprises an exchangeable lens system, and the focus detecting step includes the step of detecting a vertical scanning period of the video signal generated in the generation step, which is installed on an imaging apparatus main body, on the basis of television format information obtained from the imaging apparatus main body via a communication.

11. The method according to claim 7, wherein said lens system comprises an exchangeable lens system, and the focus detecting step includes the step of obtaining a vertical scanning period of the video signal generated in the generation step, which is installed on an imaging apparatus main body, via a communication.

12. The method according to claim 7, wherein driving of said zoom lens group and focus compensation lens group is controlled by a stepping motor.

13. A storage medium which is used in an imaging apparatus having a lens system including a zoom lens group for changing a field angle and a focus compensation lens group having both a function of correcting a change in focal plane position upon movement of said zoom lens group and a focus adjustment function, and storage means for storing a locus that represents a positional relationship between said zoom lens group and focus compensation lens group in an in-focus state in correspondence with an object distance, and which stores a program for moving said zoom lens group and focus compensation lens group to trace the locus stored in said storage means upon zooming, said program stored in said storage medium including:

a generation routine for generating a video signal by photoelectrically converting an optical image obtained via said lens system;

a focus detection routine for detecting a focus state by extracting a focus value from the video signal generated in the generation routine in a predetermined period; and a control routine for changing the period on the basis of a moving speed of said zoom lens group.

14. The medium according to claim 13, wherein the control routine includes a routine for dividing a period of processing for detecting the focus state by the moving speed of said zoom lens group to obtain a quotient, and determining an in-focus level extracted in an extraction period n extraction periods back (n=the quotient) as an in-focus level to be compared with the currently detected in-focus level.

15. The medium according to claim 13, wherein said lens system comprises an exchangeable lens system.

16. The medium according to claim 13, wherein said lens system comprises an exchangeable lens system, and the focus detection routine includes the routine for detecting a vertical scanning period of the video signal generated in the generation routine, which is installed on an imaging apparatus main body, on the basis of television format information obtained from the imaging apparatus main body via a communication.

17. The medium according to claim 13, wherein said lens system comprises an exchangeable lens system, and the focus detection routine includes a routine for obtaining a vertical scanning period of the video signal generated in the generation routine, which is installed on an imaging apparatus main body, via a communication.

18. The medium according to claim 13, wherein driving of said zoom lens group and focus compensation lens group is controlled by a stepping motor.

19. A lens control apparatus comprising:

a zoom lens;

a focus lens;

focus detection means for detecting a focus state by extracting a focus value from a video signal in a predetermined period;

focus control means for controlling said focus lens on the basis of an output from said focus detection means; and control means for changing the period on the basis of a moving speed of said zoom lens.

20. The apparatus according to claim 19, wherein said focus detection means normally detects the focus state at a period of a vertical synchronization signal, and said control means controls to prolong the period when the moving speed of said zoom lens is low.

21. A lens control method comprising:

the focus detection step of detecting a focus state by extracting a focus value from a video signal in a predetermined period in an imaging apparatus having a zoom lens and focus lens;

the focus control step of controlling said focus lens on the basis of an output from the focus detection step; and the control step of changing the period on the basis of a moving speed of said zoom lens.

22. The method according to claim 21, wherein the focus detection step includes the step of normally detecting the focus state at a period of a vertical synchronization signal, and the control step includes the step of controlling to prolong the period when the moving speed of said zoom lens is low.

* * * * *

UNITED STATES PATENT AND TRADEMARK OFFICE
CERTIFICATE OF CORRECTION

PATENT NO. : 6,989,865 B1  Page 1 of 1
APPLICATION NO. : 09/211132
DATED : January 24, 2006
INVENTOR(S) : Seiya Ohta It is certified that error appears in the above-identified patent and that said Letters Patent is hereby corrected as shown below:

On the Cover Page, Section (54), after "AND", change "IT" to --ITS--.

Column 1, line 1, after "AND", change "IT" to --ITS--.

Signed and Sealed this

Third Day of April, 2007

JON W. DUDAS
*Director of the United States Patent and Trademark Office*